(12) United States Patent
Tanaka et al.

(10) Patent No.: US 11,186,248 B2
(45) Date of Patent: Nov. 30, 2021

(54) OCCUPANT PROTECTION DEVICE

(71) Applicant: TOYODA GOSEI CO., LTD., Kiyosu (JP)

(72) Inventors: Motoyuki Tanaka, Kiyosu (JP); Hajime Kitte, Kiyosu (JP); Kenichi Fukurono, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 144 days.

(21) Appl. No.: 16/433,085

(22) Filed: Jun. 6, 2019

(65) Prior Publication Data
US 2019/0375364 A1 Dec. 12, 2019

(30) Foreign Application Priority Data

Jun. 8, 2018 (JP) .............................. JP2018-110491
Oct. 19, 2018 (JP) .............................. JP2018-197654

(51) Int. Cl.
*B60R 21/2338* (2011.01)
*B60R 21/205* (2011.01)
(Continued)

(52) U.S. Cl.
CPC ........ *B60R 21/2338* (2013.01); *B60R 21/013* (2013.01); *B60R 21/01512* (2014.10);
(Continued)

(58) Field of Classification Search
CPC .......... B60R 21/2338; B60R 21/01512; B60R 21/013; B60R 2021/01315; B60R 2021/01317; B60R 21/205; B60R 22/46; B60R 2021/0032; B60R 2021/01034; B60R 2021/01211; B60R 2021/23384
See application file for complete search history.

(56) References Cited

U.S. PATENT DOCUMENTS

| 5,494,314 A * | 2/1996 | Kriska ................ B60R 21/2346 280/740 |
| 10,137,853 B2 | 11/2018 | Ohachi et al. |
| 2002/0158456 A1* | 10/2002 | Fischer ................ B60R 21/205 280/743.2 |
| 2005/0127653 A1 | 6/2005 | Williams et al. |

(Continued)

FOREIGN PATENT DOCUMENTS

| DE | 103 25 124 A1 | 12/2004 |
| JP | 2007-513834 A | 5/2007 |

(Continued)

*Primary Examiner* — James A English
*Assistant Examiner* — Daniel M. Keck
(74) *Attorney, Agent, or Firm* — Posz Law Group, PLC

(57) ABSTRACT

An occupant protection device includes an airbag which is deployed and inflated with an amount of protrusion from a storage position to a rear side in an inflation completed state in a large protrusion amount mode and a small protrusion amount mode, and the airbag includes a bag body and a tether. The tether is connected to a length adjustment unit. The bag body has a tubular inflation portion curved in a substantially U shape from the storage position toward the tether connection portion. A shape of the bag body in the large protrusion amount mode is defined such that the tether connection portion is further moved rearward with respect to the inlet port on the inner peripheral surface side, as compared with the case of the small protrusion amount mode.

13 Claims, 22 Drawing Sheets

(51) Int. Cl.
*B60R 21/235* (2006.01)
*B60R 22/46* (2006.01)
*B60R 21/015* (2006.01)
*B60R 21/013* (2006.01)
*B60R 21/26* (2011.01)
*B60R 21/01* (2006.01)
*B60R 21/237* (2006.01)
*B60R 21/00* (2006.01)
*B60R 21/231* (2011.01)

(52) U.S. Cl.
CPC .......... *B60R 21/205* (2013.01); *B60R 21/235* (2013.01); *B60R 22/46* (2013.01); *B60R 21/237* (2013.01); *B60R 21/26* (2013.01); *B60R 2021/0032* (2013.01); *B60R 2021/01034* (2013.01); *B60R 2021/01211* (2013.01); *B60R 2021/23384* (2013.01); *B60R 2021/23509* (2013.01)

(56) References Cited

U.S. PATENT DOCUMENTS

| | | | | |
|---|---|---|---|---|
| 2006/0261589 | A1* | 11/2006 | Tanaka | B60R 22/02 |
| | | | | 280/806 |
| 2012/0242070 | A1* | 9/2012 | Paxton | B60R 21/2338 |
| | | | | 280/743.2 |
| 2016/0107598 | A1* | 4/2016 | Fischer | B60R 21/207 |
| | | | | 280/729 |
| 2017/0361800 | A1* | 12/2017 | Ohachi | B60R 21/207 |
| 2020/0039461 | A1* | 2/2020 | Ruddy | B60R 21/231 |

FOREIGN PATENT DOCUMENTS

| | | | | |
|---|---|---|---|---|
| JP | 2008-044594 A | | 2/2008 | |
| JP | 2011-031656 A | | 2/2011 | |
| JP | 2011031656 A | * | 2/2011 | |
| JP | 2017-222331 A | | 12/2017 | |
| WO | WO-2006089673 A1 | * | 8/2006 | ........... B60R 21/233 |
| WO | WO-2008063103 A1 | * | 5/2008 | ......... B60R 21/2338 |

* cited by examiner

FIG.13

| INPUT INFORMATION | | OUTPUT INFORMATION | |
|---|---|---|---|
| OCCUPANT PHYSIQUE | COLLISION SPEED | BELT TENSION | PROTRUSION AMOUNT MODE |
| BIG | MEDIUM TO LOW SPEED | LOW | LARGE |
| SMALL | MEDIUM TO LOW SPEED | LOW | SMALL |
| BIG | HIGH SPEED | HIGH | LARGE |
| SMALL | HIGH SPEED | HIGH | SMALL |

OCCUPANT PROTECTION DEVICE

CROSS-REFERENCE TO RELATED APPLICATIONS

This application is based upon and claims the benefit of priority from prior Japanese patent applications No. 2018-110491, filed on Jun. 8, 2018 and No. 2018-197654, filed on Oct. 19, 2018, the entire contents of which are incorporated herein by reference.

TECHNICAL FIELD

The present invention relates to an occupant protection device which has an airbag which is folded and stored on the front side of a seated occupant in a vehicle, is capable of receiving the occupant at the time of inflow of inflation gas and is deployed and inflated rearward from a storage position. The occupant protection device is configured to deploy and inflate the airbag with two short and long modes as the amount of protrusion from the storage position to the rear side in the airbag at the time of completion of inflation.

BACKGROUND ART

There is available an occupant protection device in which an airbag for protecting a seated occupant completes inflation with the amount of protrusion from a storage position to the rear side as variable amounts (e.g., see JP-2011-31656A and JP2007-513834A). In these airbags, the amount of protrusion to the rear side is adjusted by adjusting the length dimension of a tether having a leading end connected to the vicinity of a rear end of the airbag. Specifically, the protrusion mode of the airbag is adjusted so that the short one of two types of short and long tethers is released to protect a head of a small occupant or the long one thereof is released to protect an abdomen of a large occupant (see JP-2011-31656A). Further, the connection state of one type of tether with an airbag may be maintained to reduce the amount of protrusion of the airbag, or the tether may be broken to increase the amount of protrusion of the airbag (see JP-2007-513834A).

However, with any occupant protection device, the volume of the airbag is also increased when the amount of protrusion of the airbag is increased. Therefore, it is necessary to select an inflator whose output corresponds to the capacity of the airbag or the amount of base fabric for manufacturing the airbag is also increased, and there is room for improvement.

The present invention has been made to solve the above-described problem and an object thereof is to provide an occupant protection device which is capable of adjusting the amount of protrusion of an airbag by suppressing an increase in the volume of the airbag itself even when the amount of protrusion of the airbag is variable.

SUMMARY OF INVENTION

According to an aspect of the invention, there is provided an occupant protection device comprising: an airbag which is folded and stored on a front side of a seated occupant in a vehicle, is capable of receiving the occupant at a time of inflow of inflation gas and is deployed and inflated rearward from a storage position, wherein the airbag is deployed and inflated with an amount of protrusion from the storage position to a rear side in an inflation completed state of the airbag in at least two modes of a large protrusion amount mode and a small protrusion amount mode, the airbag includes a bag body which has an inlet port for introducing the inflation gas and in which a peripheral edge of the inlet port is fixedly disposed on the storage position side, and a tether which has a leading end connected to the bag body and a root portion side connected to the storage position side, the tether is connected to a length adjustment unit provided on the storage position side so that a distance from the storage position to which the root portion side is connected to a tether connection portion of the bag body at a time of completion of inflation to which the leading end is connected can be adjusted to two short and long modes of a first distance and a second distance longer than the first distance so as to correspond to the large protrusion amount mode and the small protrusion amount mode, the bag body has a tubular inflation portion curved in a substantially U shape from the storage position toward the tether connection portion at the time of completion of inflation in the small protrusion amount mode, a shape of the bag body in the small protrusion amount mode is defined such that the tether connection portion comes close to the inlet port side on an inner peripheral surface side of the tubular inflation portion, and a shape of the bag body in the large protrusion amount mode is defined such that the tether connection portion is further moved rearward with respect to the inlet port side on the inner peripheral surface side of the tubular inflation portion, as compared with the case of the small protrusion amount mode.

BRIEF DESCRIPTION OF DRAWINGS

FIG. 13 is a table showing a state in which a control device of the occupant protection device according to the fifth embodiment adjusts a tether length adjustment unit and a seat belt device according to an occupant physique and a vehicle speed;

DESCRIPTION OF EMBODIMENTS

Figure 1:
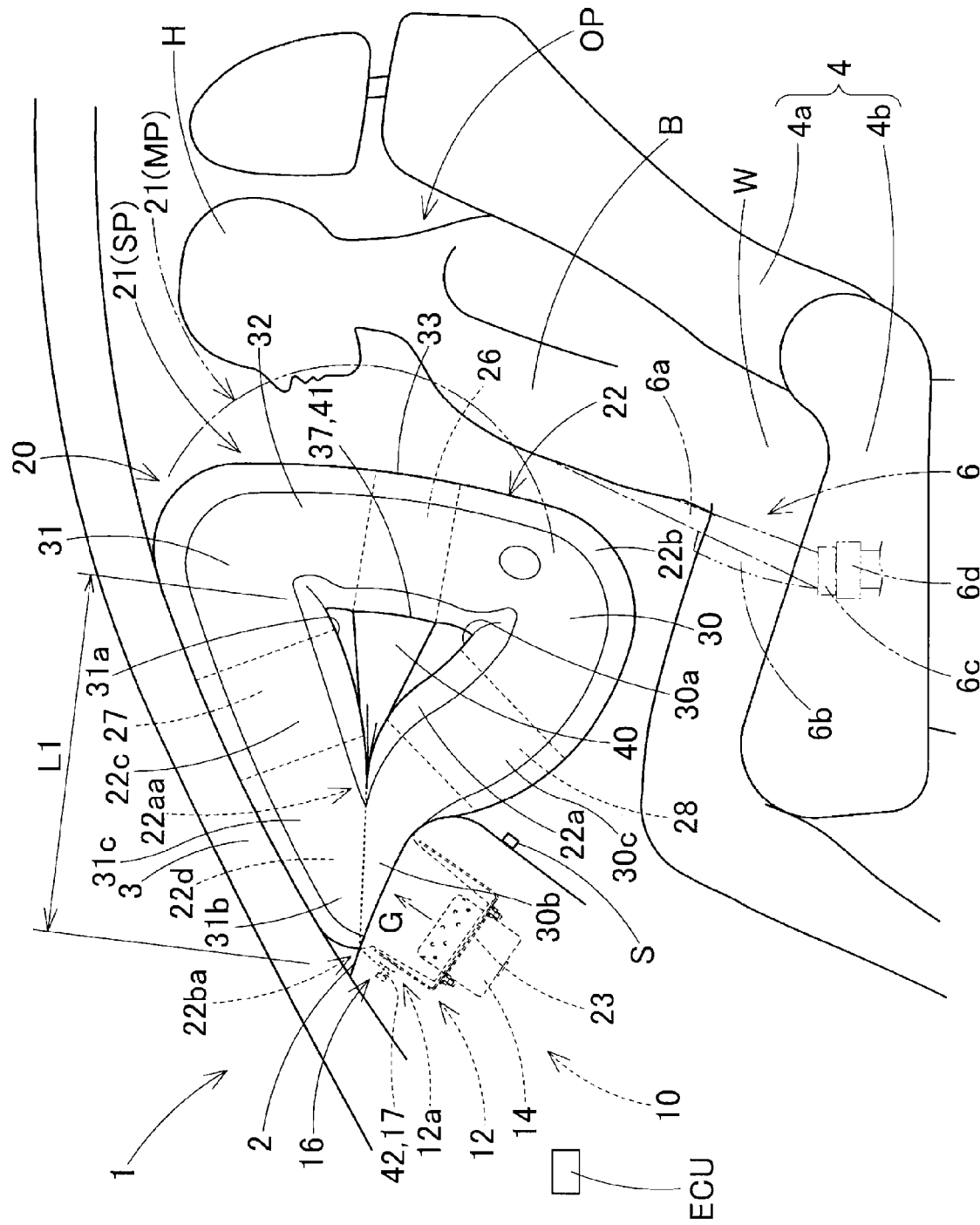
FIG. 1 is a view showing an operating state of an occupant protection device according to a first embodiment of the present invention and is a schematic side view showing a state in which an airbag completes inflation in a small protrusion amount mode.
Figure 2:
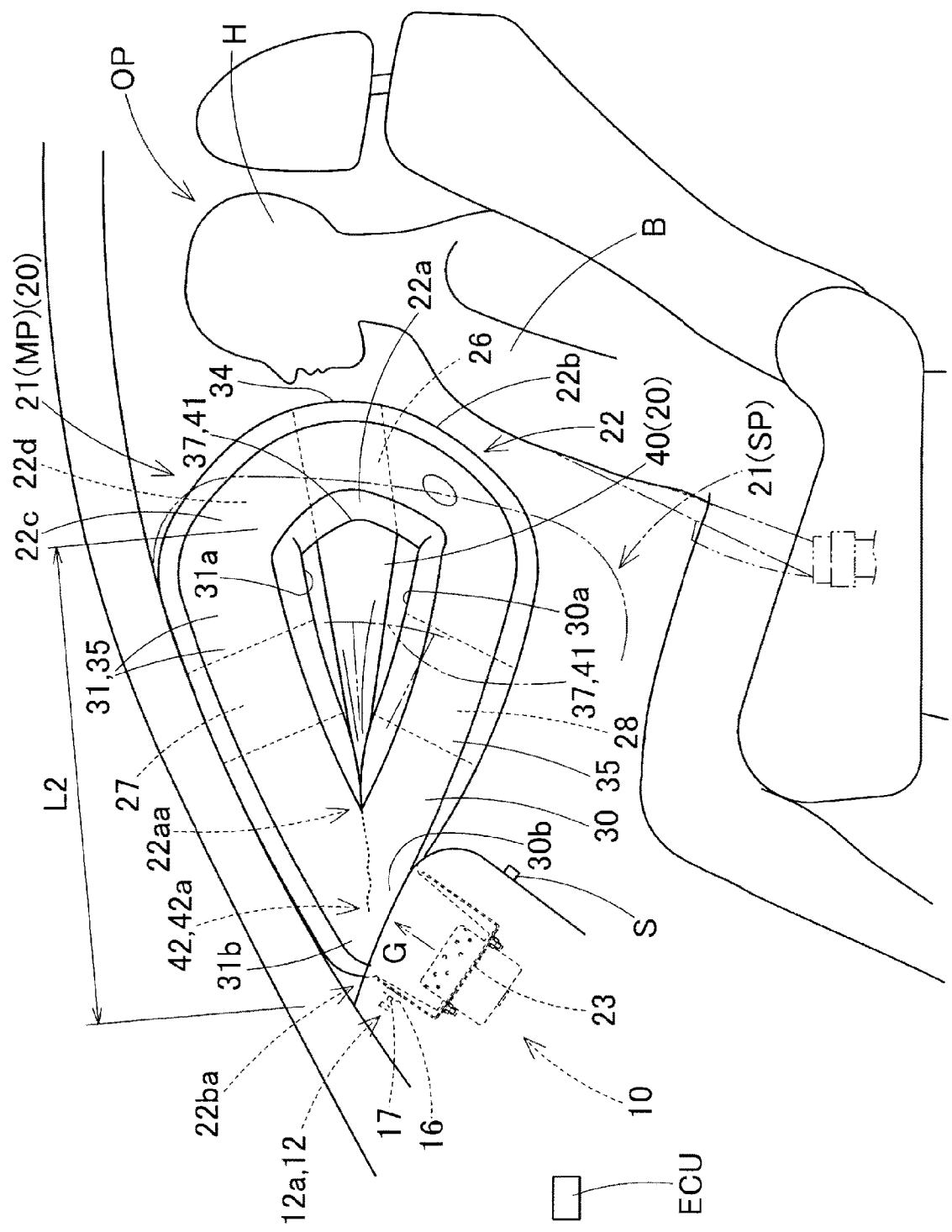
FIG. 2 is a view showing an operating state of the occupant protection device according to the first embodiment and is a schematic side view showing a state in which the airbag completes inflation in a large protrusion amount mode.

Hereinafter, an embodiment of the present invention will be described with reference to the drawings. As shown in FIGS. 1 and 2, an occupant protection device 10 according to a first embodiment is mounted on a vehicle body side portion in front of a passenger seat on a front seat side of a vehicle 1, that is, on the portion of an instrument panel 2.

A passenger seat 4 has a backrest portion 4a and a seating portion 4b. An occupant OP seated on the seat 4 is normally seated while wearing belts 6a, 6b of a seat belt device 6. The shoulder belt 6a extending from a tongue plate 6c to be assembled to a buckle 6d is disposed in front of a chest B of the occupant OP, and the lap belt 6b extending from the tongue plate 6c is disposed in front of a waist W.

The occupant protection device 10 includes an airbag 20, an inflator 14 for supplying an inflation gas G to the airbag 20, and an actuator 16 as a length adjustment unit for adjusting the length of a tether 40 disposed in the airbag 20.

Meanwhile, the operation of the inflator 14 and the actuator 16 in the occupant protection device 10 is controlled by a control device ECU. When a signal is input from a collision detection sensor configured to detect a collision of the vehicle 1 and disposed on a front bumper or the like and it is determined that a collision has occurred, the control device ECU operates the inflator 14. Further, when trying to operate the inflator 14, the control device ECU activates the actuator 16 when it is determined by an operation confirmation sensor S such as a camera mounted on the instrument panel 2 or the like that the occupant OP is seated apart from the normal position.

The airbag 20 is folded and stored in a storage position (storage portion) 12 at an upper surface side of the instrument panel 2 in front of the seat 4. As shown in FIGS. 1 and 2, the airbag 20 is deployed and inflated with the amount of protrusion from the storage position 12 toward the rear side in an inflation completed state in two modes of a large protrusion amount mode MP and a small protrusion amount mode SP. The airbag 20 includes a bag body 21 which is inflated by the inflow of the inflation gas G from the inflator 14, and the tether 40 which has a leading end 41 connected to the bag body 21 and has a root portion 42 connected to the actuator 16 as an adjustment unit on the side of the storage position 12.

A basic shape of the bag body 21 at the time of completion of inflation in a state where the tether 40 is not regulated is a shape protruding in a substantially elliptical annular shape (loop shape) from the storage position 12, as shown in FIG. 2. An outer peripheral wall 22 of the bag body 21 has an inner wall 22a on the inner peripheral side, an outer wall 22b on the outer peripheral side, and left and right side walls 22c, 22d. An inlet port 23 for introducing the inflation gas G from the inflator 14 into the bag body 21 is circularly opened on the lower surface of the front portion of the outer wall 22b (see FIG. 3). An upper portion of the inflator 14 from which the inflation gas G is discharged is inserted into the inlet port 23, and a peripheral edge of the inlet port 23 is fixed together with the inflator 14 to the side of the storage position 12. In other words, a basic shape of the bag body 21 at the time of completion of inflation is a shape having two curved tubular inflation portions 30, 31 which bifurcate from the storage position 12. The tubular inflation portions 30, 31 are connected in such a manner that rear ends thereof away from the inlet port 23 merge from above and below. The merging point is a tether connection portion 37 for connecting the leading end 41 of the tether 40 as described later. That is, the tubular inflation portions 30, 31 have a shape extending from the storage position 12 toward the tether connection portion 37 and curved so as to inflate in a substantially U shape (specifically, the tubular inflation portion 30 has a substantially U shape and the tubular inflation portion 31 has a substantially U shape vertically inverted, that is, a substantially inverted U shape). In other words, the bag body 21 at the time of completion of inflation includes an upper portion 31c on the side of the tubular inflation portion 31, a lower portion 30c on the side of the tubular inflation portion 30, and a rear portion 32 serving as a merging portion on the leading end side and a connection portion between rear ends of the upper portion 31c and the lower portion 30c. The upper portion 31c and the lower portion 30c are branched up and down from the inlet port side.

Figure 3:
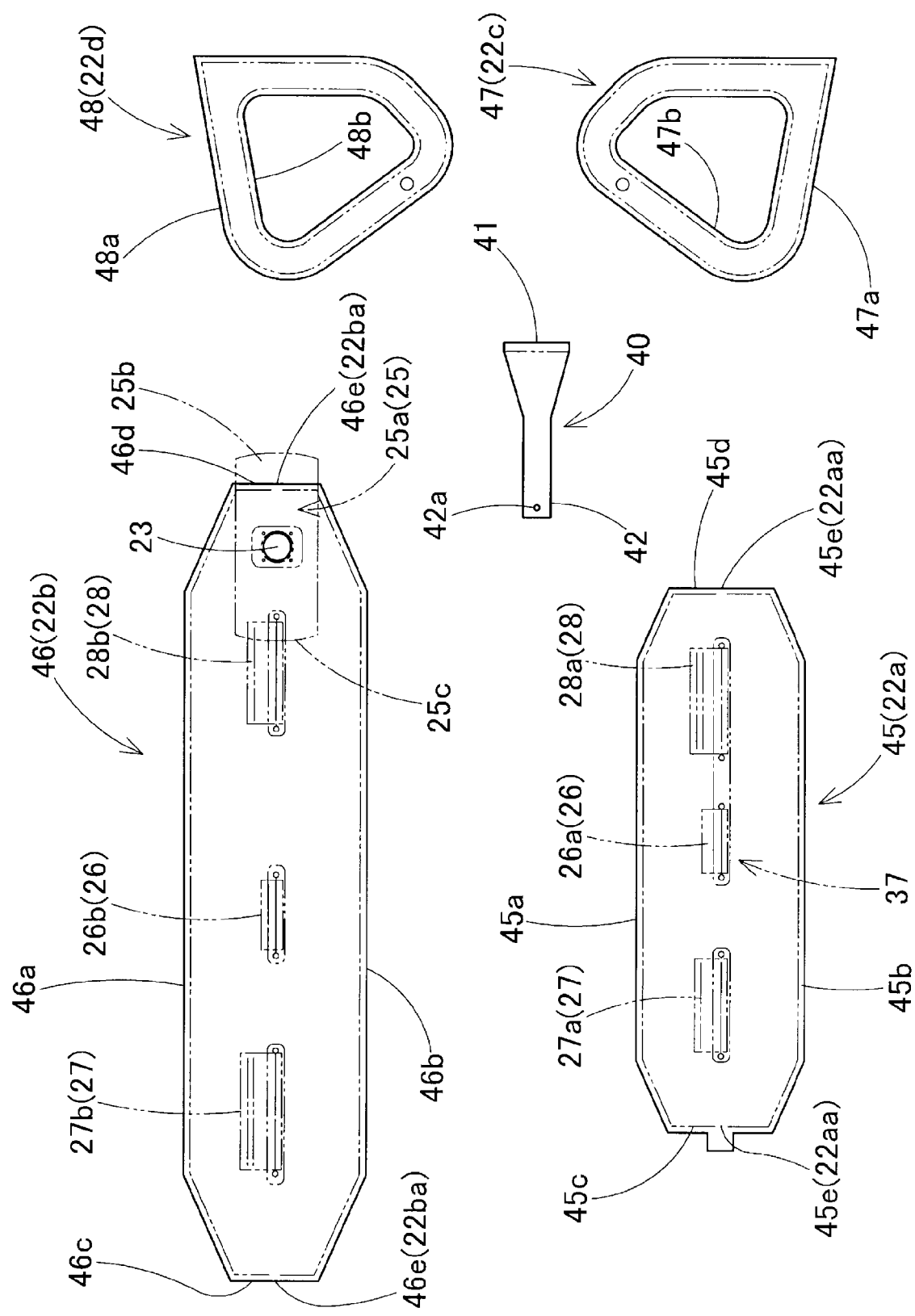
FIG. 3 is a plan view showing constituent materials of the airbag in the first embodiment.

As shown in FIG. 3, a base fabric constituting the outer peripheral wall 22 of the bag body 21 has an inner base fabric 45 constituting the inner wall 22a, an outer base fabric 46 constituting the outer wall 22b, a left base fabric 47 constituting the left side wall 22c, and a right base fabric 48 constituting the right side wall 22d. Further, the outer peripheral wall 22 is formed by sewing an outer peripheral edge 47a of the left base fabric 47 and a side edge 46a of the outer base fabric 46, sewing an inner peripheral edge 47b of the left base fabric 47 and a side edge 45a of the inner base fabric 45, sewing an outer peripheral edge 48a of the right base fabric 48 and a side edge 46b of the outer base fabric 46, sewing an inner peripheral edge 48b of the right base fabric 48 and a side edge 45b of the inner base fabric 45, sewing both ends 45c, 45d of the inner base fabric 45 together, and sewing both ends 46c, 46d of the outer base fabric 46 together. After these sutures are completed, the bag body 21 is turned over using the inlet port 23 so that seam allowance does not appear on the outer surface side.

Meanwhile, unsewed portions 45e, 46e are disposed near the center in a right and left direction on the sewn portion of the both ends 45c, 45d of the inner base fabric 45 and the sewn portion of the both ends 46c, 46d of the outer base fabric 46. Through-holes 22aa, 22ba are formed in the inner wall 22a and the outer wall 22b. The through-holes 22aa, 22ba are formed by the unsewed portions 45e, 46e through which the tether 40 passes.

Further, on the inside of the bag body 21, a rectifying fabric 25 for flowing inflation gas introduced from the inlet port 23 to both right and left sides is disposed on the peripheral edge of the inlet port 23, and connecting pieces 26, 27, 28 for connecting the inner wall 22a and the outer wall 22b so that the inner wall 22a and the outer wall 22b are not separated from each other by a predetermined distance or more are disposed. The connecting pieces 26, 27, 28 have inner fabrics 26a, 27a, 28a connected to the inner base fabric 45 and outer fabrics 26b, 27b, 28b connected to the outer base fabric 46. Each of the connecting pieces 26, 27, 28 is disposed in such a manner that the inner fabrics 26a, 27a, 28a are respectively connected to the inner base fabric 45 and the outer fabrics 26b, 27b, 28b are respectively connected to the outer base fabric 46, and then, the bag body 21 formed by sewing the outer peripheral wall 22 is inverted through the inlet port 23, and then, the inner fabrics 26a, 27a, 28a and the outer fabrics 26b, 27b, 28b corresponding to each other are pulled out from the inlet port 23 and connected to each other and stored in the bag body 21.

Meanwhile, the rectifying fabric 25 is disposed in such a manner that a sheet material 25a for the rectifying fabric is sewn to a peripheral edge of the inlet port 23, the bag body 21 is inverted through the inlet port 23, and then, both front and rear ends 25b, 25c are pulled out from the inlet port 23 and sewn with each other, and then, the sewn portion thereof is stored in the bag body 21.

The leading end 41 of the tether 40 is joined, by sewing, to a rear end portion of the inner wall 22a of the bag body 21 at the time of completion of inflation, specifically, to the tether connection portion 37 which is an intermediate position in a longitudinal direction of the inner base fabric 45. In other words, the tether connection portion 37 is disposed at a merging position (the rear portion 32) of the leading end portions (rear end portions) of the tubular inflation portions 30, 31 which bifurcate from the inlet port 23 (the storage position 12). Further, an annular connection hole 42a (see FIG. 3) is formed at the root portion 42 of the tether 40. Further, the root portion 42 is locked by a lock pin 17 of the actuator 16 as a length adjustment unit by inserting the lock pin 17 into the connection hole 42a. Meanwhile, the tether 40 is locked by the lock pin 17 of the actuator 16 in such a manner that the leading end 41 connected to the tether connection portion 37 enters the bag body 21 through the through-hole 22aa of the inner wall 22a of the bag body 21 in a state where the root portion 42 is locked by the lock pin 17 and protrudes to the outside of the bag body 21 through the through-hole 22ba of the outer wall 22b.

The tether 40 is connected to the lock pin 17 of the actuator 16 as a length adjustment unit provided on the side of the storage position 12 so that the distance from the storage position 12 to which the root portion 42 is connected, specifically, a front edge 12a of the storage position (storage portion) 12 to the tether connection portion 37 of the bag body 21 to which the leading end 41 is connected at the time of completion of inflation can be adjusted to two short and long modes of a first distance L1 (see FIG. 1) and a second distance L2 (see FIG. 2) longer than the first distance L1 so as to correspond to the large protrusion amount mode MP and the small protrusion amount mode SP.

In the case of the first embodiment, the first distance L1 is defined as a distance from the storage position 12 (the front edge 12a) to the tether connection portion 37 when the bag body 21 completes inflation in a state where the root portion 42 is locked by the lock pin 17, and the second distance L2 is defined as a distance from the storage position 12 (the front edge 12a) to the tether connection portion 37 when the bag body 21 completes inflation in a state where the locking of the root portion 42 is released.

The actuator 16 is formed of a micro gas generator (MGG) or the like. When an operation signal from the control device ECU is input, the actuator 16 is actuated to pull out the lock pin 17 from the connection hole 42a provided in the root portion 42 of the tether 40. Meanwhile, as described above, when it is detected by the operation confirmation sensor S that the occupant OP is located behind the normal position, the control device ECU that has received the signal activates the actuator 16 together with the operation of the inflator 14 according to the determination of collision detection.

Therefore, at the time of completion of inflation in the small protrusion amount mode SP in which the distance from the storage position 12 to the tether connection portion 37 is expanded as the first distance L1 in a state where the root portion 42 of the tether 40 is locked by the lock pin 17, the bag body 21 has the tubular inflation portions 30, 31 curved in a substantially U shape from the storage position 12 toward the tether connection portion 37 on the rear end side. The shape of the bag body 21 in the small protrusion amount mode SP is defined such that the tether connection portion 37 comes close to opening-side portions 30b, 31b on the side of the storage position 12 (on the side of the inlet port 23) in inner peripheral surfaces 30a, 31a of the tubular inflation portions 30, 31.

Further, in a state where the actuator 16 is actuated to pull out the lock pin 17 from the connection hole 42a and the tether 40 is released, the bag body 21 completes inflation in the large protrusion amount mode MP in which the distance from the storage position 12 to the tether connection portion 37 is expanded as the second distance L2. The shape of the bag body 21 in the large protrusion amount mode MP is defined such that the tether connection portion 37 is further moved rearward with respect to the opening-side portions 30b, 31b on the side of the inlet port 23 in the inner peripheral surfaces 30a, 31a of the tubular inflation portions 30, 31, as compared with the case of the small protrusion amount mode SP.

As a result, the bag body 21 of the airbag 20 can receive a head H and the chest B of the occupant OP in the normal position when inflation is completed in the small protrusion amount mode SP, as shown in FIG. 1. Further, the bag body 21 of the airbag 20 can receive the head H and the chest B of the occupant OP seated on the rear side of the normal position when inflation is completed in the large protrusion amount mode MP, as shown in FIG. 2.

As described above, the small protrusion amount mode SP and the large protrusion amount mode MP are set by strongly curving the curved state of the curved tubular inflation portions 30, 31 or loosening the degree of curving thereof. Specifically, the small protrusion amount mode SP is set when the curved state is strongly curved, and the large protrusion amount mode MP is set when the curved state is loosened. The influence of increase and decrease of volume itself is suppressed, so that the bag body 21 can be deployed and inflated as the small protrusion amount mode SP or the large protrusion amount mode MP just by adjusting the curved state of the tubular inflation portions 30, 31.

Therefore, in the occupant protection device 10 of the first embodiment, even when the protrusion amount of the bag body 21 in the airbag 20 is variable, the protrusion amount of the airbag 20 can be adjusted while the increase in the capacity of the bag body 21 itself is suppressed.

Further, in the occupant protection device 10 of the first embodiment, the bag body 21 at the time of completion of inflation has two tubular inflation portions 30, 31 which bifurcate from the side of the inlet port 23 and merge near the tether connection portion 37 on the leading end side.

Therefore, in the first embodiment, when the deployment and inflation of the bag body 21 in the small protrusion amount mode SP is completed, the vicinity of the tether connection portion 37 becomes the merging portion of the two tubular inflation portions 30, 31 and is pulled by the tether 40, thereby forming a planar portion 33. The planar portion 33 can receive the occupant OP over a wide area and can be bent and deformed to receive and protect the occupant OP. Further, when the deployment and inflation of the bag body 21 in the large protrusion amount mode MP is completed, the vicinity of the tether connection portion 37 protrudes rearward to form a small planar portion 34. However, when receiving the occupant OP by the small planar portion 34, the portions of the two tubular inflation portions 30, 31 extending forward from the planar portion 34 are arranged in a columnar shape substantially along the front and rear direction, and hence, the occupant OP can be received and protected by the buckling of columnar support portions 35 thereof.

Meanwhile, at the time of completion of inflation, the bag body 21 in the small protrusion amount mode SP and the large protrusion amount mode MP is supported by a vehicle body side member such as the instrument panel 2 and a windshield 3 in the vicinity of the storage position 12 and can secure a reaction force to receive the occupant OP. In other words, when the bag body 21 is inflated or receives an occupant, the lower portion 30c can be supported by the instrument panel 2 at least on the front side, and the upper portion 31c can be supported by the windshield 3 at least on the front side (substantially the entire area in the case of the illustrated example). In this manner, a sufficient reaction force when receiving the occupant OP by the rear portion 32 can be secured from the instrument panel 2 and the windshield 3, and the occupant OP can be suitably protected.

Further, in the airbag 20 of the first embodiment, during the small protrusion amount mode SP, a portion of the tether 40 extending from the leading end 41 to the root portion 42 enters the bag body 21 through the through-holes 22aa, 22ba and is connected to the lock pin 17 of the actuator 16 as a length adjustment unit.

Therefore, in the first embodiment, even when the two tubular inflation portions 30, 31 are arranged to bifurcate from the vicinity of the inlet port 23 disposed in the storage position 12, the tether 40 extending from the tether connection portion 37 is passed through the bag body 21 and can be smoothly connected to the lock pin 17 of the actuator 16 as a length adjustment mechanism disposed in the storage position 12.

Meanwhile, in the first embodiment, when the bag body 21 of the airbag 20 is inflated in the large protrusion amount mode MP, the lock pin 17 of the actuator 16 as a length adjustment mechanism is pulled out from the connection hole 42a on the side of the root portion 42 of the tether 40 to release the tether 40. However, when the second distance L2 can be secured as the separation distance from the storage position 12 to the tether connection portion 37, the tether 40 may be configured so that a margin is provided on the side of the root portion 42 to partially release the root portion 42 and a terminal of the root portion 42 is kept connected to the side of the storage position 12 without being released. Further, the root portion 42 of the tether 40 may be released in multiple stages as appropriate. In addition to the first distance L1 and the second distance L2, the regulation distance from the storage position 12 to the tether connection portion 37 by the tether 40 may include a third distance or a fourth distance or the like and may be set to three or more stages. In that case, the bag body 21 can be inflated in the three or more modes of protrusion amount.

Further, in the first embodiment, the bag body 21 at the time of completion of inflation is configured so that the connecting pieces 26, 27, 28 for regulating the separation distance between the inner wall 22a and the outer wall 22b of the tubular inflation portions 30, 31 are respectively disposed inside the upper portion 31c, the lower portion 30c, and the rear portion 32.

Therefore, in the first embodiment, the bag body 21 at the time of completion of inflation is restricted in the thickness dimensions of the upper portion 31c, the lower portion 30c, and the rear portion 32, so that the looped inflation-completed shape can be stabilized and the protection performance at the time of receiving the occupant can be stabilized.

Figure 4:
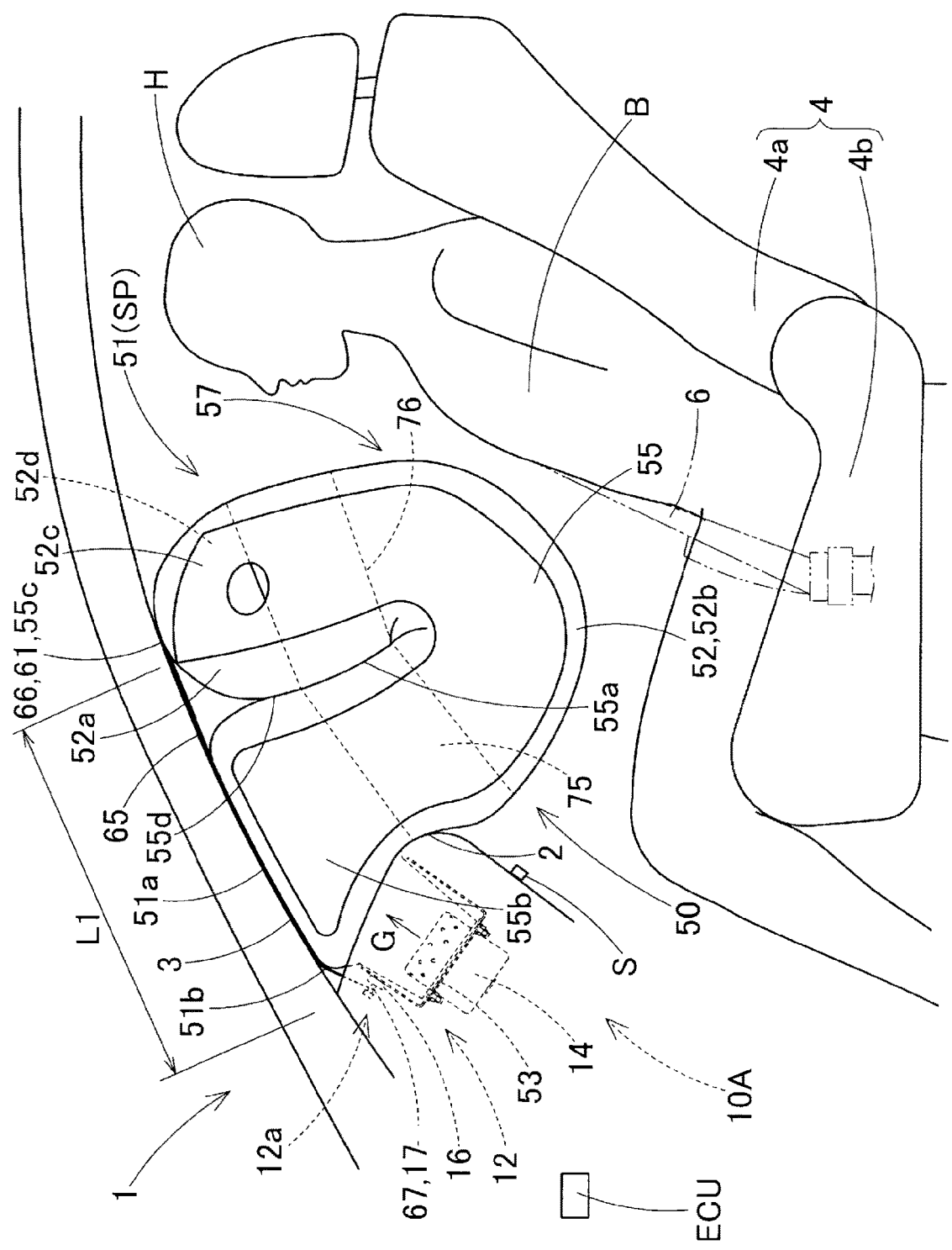
FIG. 4 is a view showing an operating state of an occupant protection device according to a second embodiment and is a schematic side view showing a state in which an airbag completes inflation in a small protrusion amount mode.

Furthermore, in the first embodiment, the bag body 21 in which the two tubular inflation portions 30, 31 bifurcating from the side of the inlet port 23 (the side of the storage position 12) and merging in the vicinity of the tether connection portion 37 are arranged above and below has been described as an example. However, the two tubular inflation portions 30, 31 may be configured to bifurcate left and right. Furthermore, three or more tubular inflation portions curved to bulge outward may be arranged so that an increase in volume can be suppressed. Alternatively, as in an occupant protection device 10A of the second embodiment as shown in FIGS. 4 to 6, one tubular inflation portion 55 of a bag body 51 in an airbag 50 may be arranged to extend in a substantially U-shaped curve from the storage position 12 toward a tether connection portion 61 at the leading end.

Similar to the first embodiment, the airbag 50 is folded and stored in the storage position 12 with the upper surface side of the instrument panel 2 in front of the seat 4 as the storage position 12. As shown in FIGS. 4 and 5, the airbag 50 is deployed and inflated in a state where the amount of protrusion from the storage position 12 toward the rear side in an inflation completed state is set to two modes of the large protrusion amount mode MP and the small protrusion amount mode SP. The airbag 50 includes the bag body 51 which is inflated by the inflow of the inflation gas G from the inflator 14, and a tether 65 which has a leading end 66 connected to the bag body 51 and has a root portion 67 connected to the actuator 16 as an adjustment unit on the side of the storage position 12.

Figure 5:
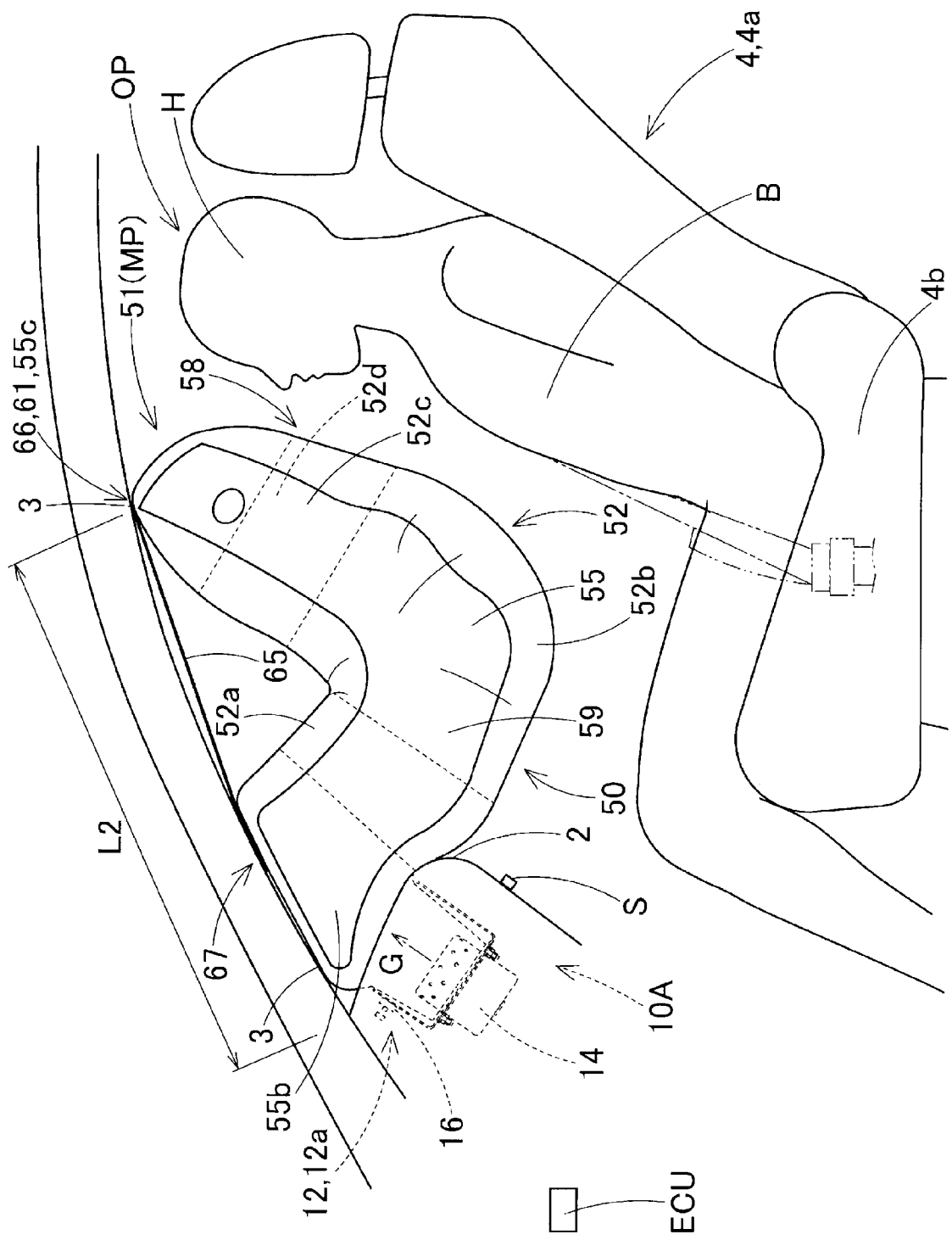
FIG. 5 is a view showing an operating state of the occupant protection device according to the second embodiment and is a schematic side view showing a state in which the airbag completes inflation in a large protrusion amount mode.

A basic shape of the bag body 51 at the time of completion of inflation in a state where the tether 65 is not regulated is a shape protruding in a substantially U shape swelling downward from the storage position 12, as shown in FIG. 5. An outer peripheral wall 52 of the bag body 51 has an inner wall 52*a* on the inner peripheral side, an outer wall 52*b* on the outer peripheral side, and left and right side walls 52*c*, 52*d*. An inlet port 53 for introducing the inflation gas G from the inflator 14 into the bag body 51 is circularly opened on the lower surface of the front portion of the outer wall 52*b* (see FIG. 6). An upper portion of the inflator 14 from which the inflation gas G is discharged is inserted into the inlet port 53, and a peripheral edge of the inlet port 53 is fixed together with the inflator 14 to the side of the storage position 12. In other words, a basic shape of the bag body 51 at the time of completion of inflation is a shape having the tubular inflation portion 55 which is curved downward in a substantially U shape from the portion of the inlet port 53.

Figure 6:
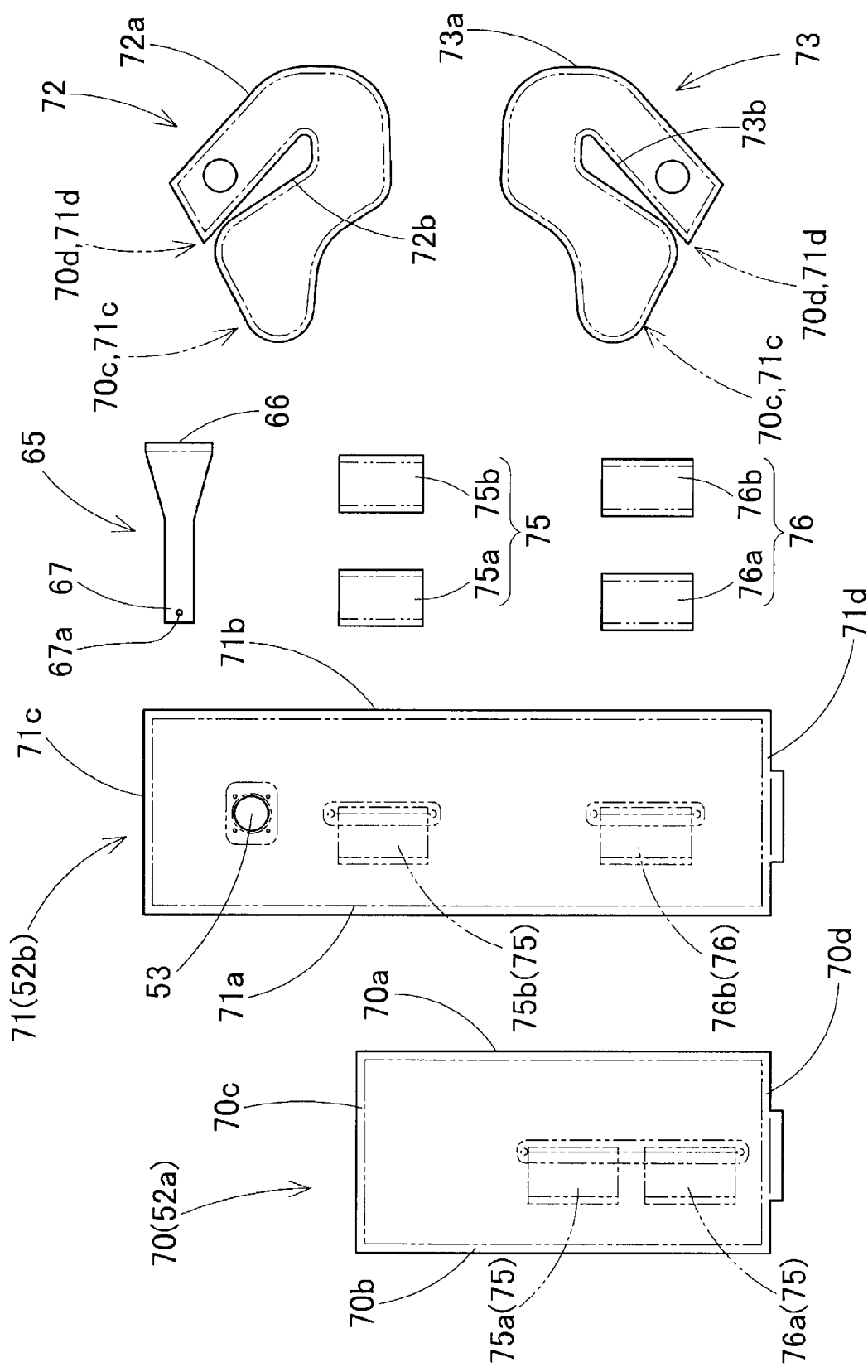
FIG. 6 is a plan view showing constituent materials of the airbag in the second embodiment.

As shown in FIG. 6, a base fabric constituting the outer peripheral wall 52 of the bag body 51 has an inner base fabric 70 constituting the inner wall 52*a*, an outer base fabric 71 constituting the outer wall 52*b*, a left base fabric 72 constituting the left side wall 52*c*, and a right base fabric 73 constituting the right side wall 52*d*. Further, the outer peripheral wall 52 is formed by sewing an outer peripheral edge 72*a* of the left base fabric 72 and a side edge 71*a* of the outer base fabric 71, sewing an inner peripheral edge 72*b* of the left base fabric 72 and a side edge 70*a* of the inner base fabric 70, sewing an outer peripheral edge 73*a* of the right base fabric 73 and a side edge 71*b* of the outer base fabric 71, sewing an inner peripheral edge 73*b* of the right base fabric 73 and a side edge 70*b* of the inner base fabric 70, sewing an end 70*c* on the front end side of the inner base fabric 70 and an end 71*c* on the front end side of the outer base fabric 71, and sewing an end 70*d* on the rear end side of the inner base fabric 70 and an end 71*d* on the rear end side of the outer base fabric 71. After these sutures are completed, the bag body 51 is turned over using the inlet port 53 so that seam allowance does not appear on the outer surface side.

Meanwhile, on the inside of the bag body 51, connecting pieces 75, 76 for connecting the inner wall 52*a* and the outer wall 52*b* so that the inner wall 52*a* and the outer wall 52*b* are not separated from each other by a predetermined distance or more are disposed. The connecting pieces 75, 76 have inner fabrics 75*a*, 76*a* connected to the inner base fabric 70 and outer fabrics 75*b*, 76*b* connected to the outer base fabric 71. Each of the connecting pieces 75, 76 is disposed in such a manner that the inner fabrics 75*a*, 76*a* are respectively connected to the inner base fabric 70 and the outer fabrics 75*b*, 76*b* are respectively connected to the outer base fabric 71, and then, the bag body 51 is inverted through the inlet port 53, and then, the inner fabrics 75*a*, 76*a* and the outer fabrics 75*b*, 76*b* corresponding to each other are pulled out from the inlet port 53 and connected to each other and stored in the bag body 51.

Further, similar to the first embodiment, a rectifying fabric (not shown) for flowing inflation gas introduced from the inlet port 53 to both right and left sides is disposed on the peripheral edge of the inlet port 53. This rectifying fabric is also disposed in the same manner as in the first embodiment.

The leading end 66 of the tether 65 is joined, by sewing, to a rear end portion of the inner wall 52*a* of the bag body 51 at the time of completion of inflation, specifically, to the tether connection portion 61 which is a sewn portion of the ends 70*d*, 71*d* of the inner base fabric 70 and the outer base fabric 71. In other words, the tether connection portion 61 is disposed at a leading end (rear end) 55*c* of the tubular inflation portion 55 extending from the inlet port 53. Further, an annular connection hole 67*a* is formed in the root portion 67 of the tether 65. In addition, the root portion 67 is locked by the lock pin 17 of the actuator 16 as a length adjustment unit by inserting the lock pin 17 into the connection hole 67*a* (see FIG. 6). Meanwhile, the tether 65 is disposed on the outer surface side without entering the bag body 51. Specifically, on the outer peripheral surface side of the bag body 51 at the time of completion of inflation in the small protrusion amount mode SP, the root portion 67 of the tether 65 is disposed to be locked by the lock pin 17 of the actuator 16 in a state where the tether is in contact with an upper surface 51*a* and a front surface 51*b* on the outer peripheral surface of the bag body 51 from the leading end 66 connected to the tether connection portion 61.

The tether 65 is connected to the lock pin 17 of the actuator 16 as a length adjustment unit provided on the side of the storage position 12 so that the distance from the storage position 12 to which the root portion 67 is connected to the tether connection portion 61 of the bag body 51 to which the leading end 66 is connected at the time of completion of inflation can be adjusted to two short and long modes of the first distance L1 (see FIG. 4) and the second distance L2 (see FIG. 5) longer than the first distance L1 so as to correspond to the large protrusion amount mode MP and the small protrusion amount mode SP.

In the case of the second embodiment, the first distance L1 is defined as a distance from the storage position 12 to the tether connection portion 61 when the bag body 51 completes inflation in a state where the root portion 67 is locked by the lock pin 17, and the second distance L2 is defined as a distance from the storage position 12 to the tether connection portion 61 when the bag body 51 completes inflation in a state where the locking of the root portion 67 is released.

Therefore, in the occupant protection device 10A of the second embodiment, at the time of completion of inflation in the small protrusion amount mode SP in which the distance from the storage position 12 to the tether connection portion 61 is expanded as the first distance L1 in a state where the root portion 67 of the tether 65 is locked by the lock pin 17, the bag body 51 has the tubular inflation portion 55 curved in a substantially U shape from the storage position 12 toward the tether connection portion 61 on the rear end side. The shape of the bag body 51 in the small protrusion amount mode SP is defined such that the tether connection portion 61 comes close to an opening-side portion 55*b* on the side of the inlet port 53 in an inner peripheral surface 55*a* of the tubular inflation portion 55.

Further, in a state where the actuator 16 is actuated to pull out the lock pin 17 from the connection hole 67*a* and the tether 65 is released, the bag body 51 completes inflation in the large protrusion amount mode MP in which the distance from the storage position 12 to the tether connection portion 61 is expanded as the second distance L2. The shape of the bag body 51 in the large protrusion amount mode MP is defined such that the tether connection portion 61 is further moved rearward with respect to the opening-side portion 55*b* on the side of the inlet port 53 in the inner peripheral surface 55*a* of the tubular inflation portion 55, as compared with the case of the small protrusion amount mode SP.

As a result, the bag body 51 of the airbag 50 can receive the head H and the chest B of the occupant OP in the normal position when inflation is completed in the small protrusion amount mode SP, as shown in FIG. 4. Further, the bag body 51 of the airbag 50 can receive the head H and the chest B of the occupant OP seated on the rear side of the normal position when inflation is completed in the large protrusion amount mode MP, as shown in FIG. 5.

As described above, the small protrusion amount mode SP and the large protrusion amount mode MP are set by strongly curving the curved state of the curved tubular inflation portion 55 or loosening the degree of curving thereof. Specifically, the small protrusion amount mode SP is set when the curved state is strongly curved, and the large protrusion amount mode MP is set when the curved state is loosened. The influence of increase and decrease of volume itself is suppressed, so that the bag body 51 can be deployed and inflated as the small protrusion amount mode SP or the large protrusion amount mode MP just by adjusting the curved state of the tubular inflation portion 55.

Therefore, also in the occupant protection device 10A of the second embodiment, even when the protrusion amount of the bag body 51 in the airbag 500 is variable, the protrusion amount of the airbag 50 can be adjusted while the increase in the capacity of the bag body 51 itself is suppressed.

Meanwhile, in the second embodiment, when the deployment and inflation of the bag body 51 in the small protrusion amount mode SP is completed, the vicinity of the tether connection portion 61 is pulled by the tether 65. Therefore, a portion 57 of the tubular inflation portion 55 protruding rearward from the side of the inlet port 53 to the vicinity of the tether connection portion 61 can receive and protect the occupant OP. Further, when the deployment and inflation of the bag body 51 in the large protrusion amount mode MP is completed, the curved state of the tubular inflation portion 55 is loosened, and a receiving portion 58 shifted to the vicinity of the tether connection portion 61 than the receiving portion 57 of the occupant OP in the small protrusion amount mode SP can receive and protect the occupant OP.

In addition, when receiving the occupant OP by the receiving portion 57 of the tubular inflation portion 55 in the small protrusion amount mode SP, on the front side of the receiving portion 57, a back-side portion 55d of the receiving portion 57 on the side of the inner peripheral surface 55a of the tubular inflation portion 55 is in pressure contact with the opening-side portion 55b on the side of the inner peripheral surface 55a. In this manner, the entire of the curved tubular inflation portion 55 is supported by a vehicle body side member such as the instrument panel 2 and the windshield 3 in the vicinity of the storage position 12, and the bag body 51 can secure a reaction force to receive the occupant OP.

Further, when receiving the occupant OP by the receiving portion 58 of the tubular inflation portion 55 in the large protrusion amount mode MP, the leading end 55c of the tubular inflation portion 55 on the upper side of the receiving portion 58 of the bag body 51 is supported by the windshield 3 and a lower side thereof is supported by a columnar support portion 59 extending in a bar shape to the opening-side portion 55b and supported by the instrument panel 2 and the windshield 3. In this manner, the receiving portion 58 of the bag body 51 is indirectly supported by the instrument panel 2 and the windshield 3 in the vicinity of the storage position 12 and can secure a sufficient reaction force to receive the occupant OP.

Figure 7:
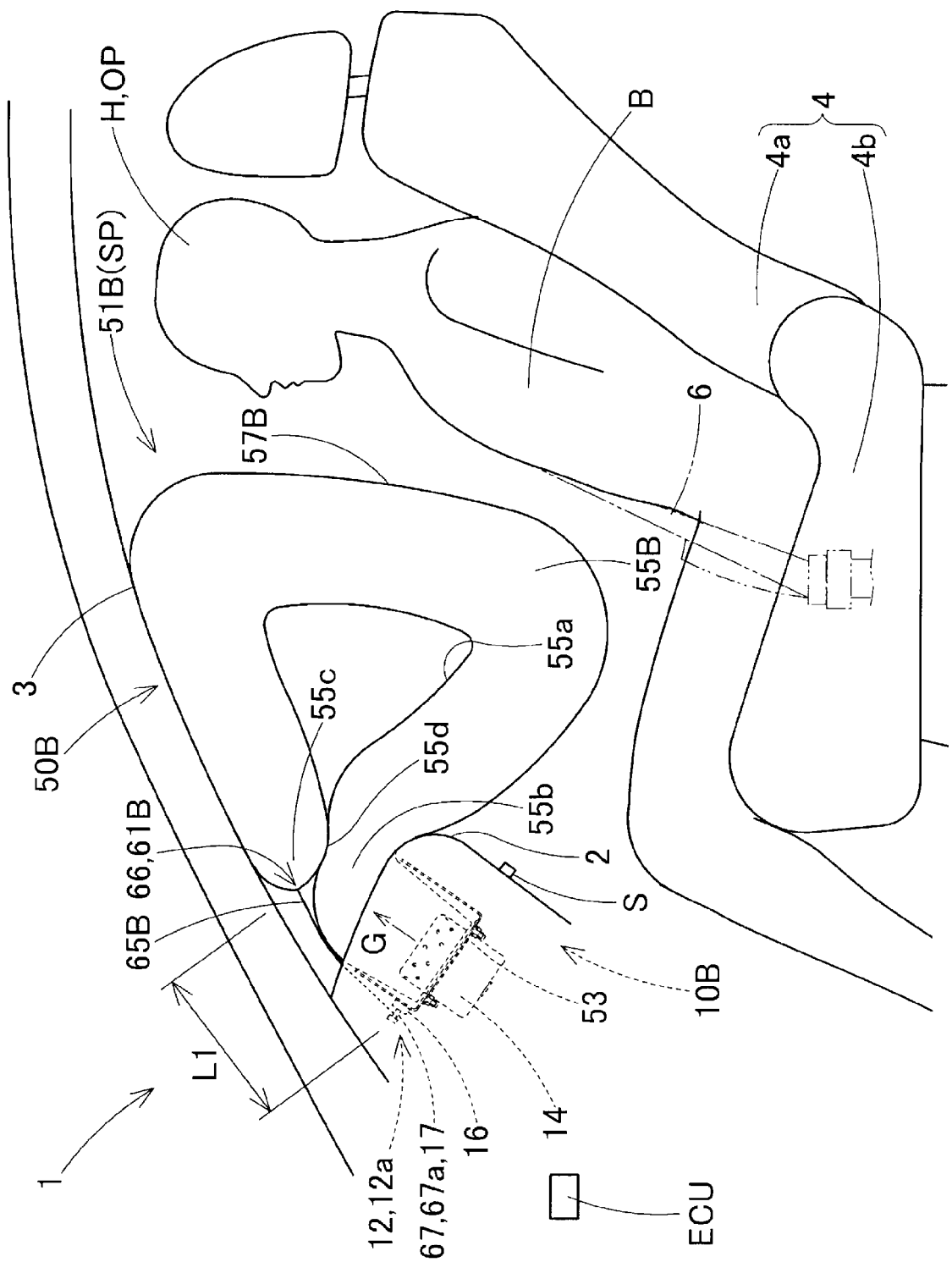
FIG. 7 is a view showing an operating state of an occupant protection device according to a third embodiment and is a schematic side view showing a state in which an airbag completes inflation in a small protrusion amount mode.
Figure 8:
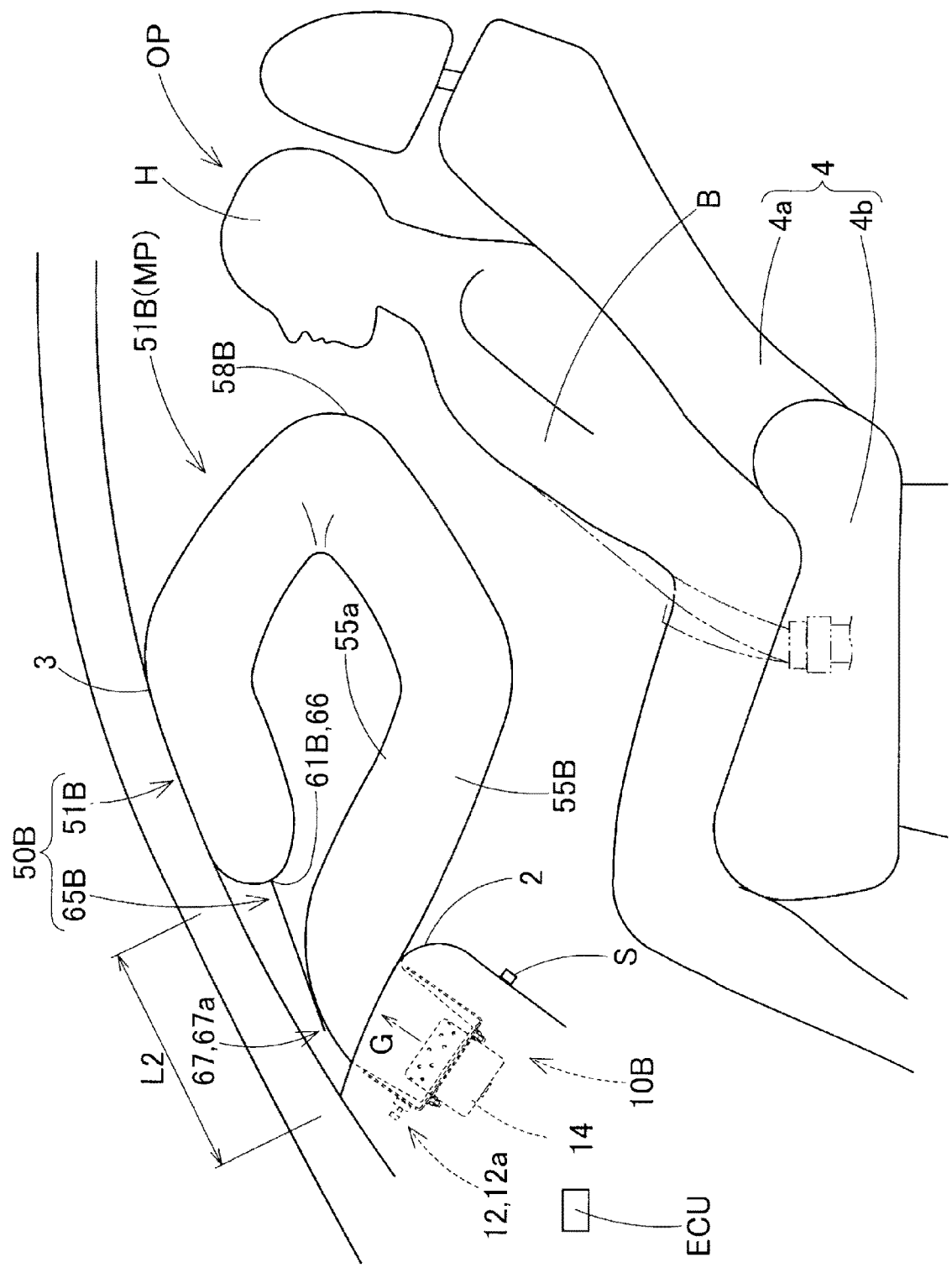
FIG. 8 is a view showing an operating state of the occupant protection device according to the third embodiment and is a schematic side view showing a state in which the airbag completes inflation in a large protrusion amount mode.

Meanwhile, in the case where a bag body of an airbag is configured by one curved tubular inflation portion, as in an occupant protection device 10B of a third embodiment shown in FIGS. 7 and 8, a curved tubular inflation portion 55B in a bag body 51B of an airbag 50B may be configured to receive the occupant OP in a substantially annular shape in both the small protrusion amount mode SP and the large protrusion amount mode MP.

In this airbag 50B, the bag body 51B is configured to complete inflation by lengthening the substantial length dimension of the tubular inflation portion 55B and largely inverting a tether connection portion 61B from the opening-side portion 55b on the side of the inlet port 53. In the small protrusion amount mode SP, the root portion 67 of a tether 65B is locked by the lock pin 17 of the actuator 16 as a length adjustment unit. In the large protrusion amount mode MP, the locking of the lock pin 17 is released and the tether 65B is released.

At the time of completion of inflation in the small protrusion amount mode SP, the bag body 51B also has the tubular inflation portion 55B curved in a substantially U shape from the storage position 12 toward the tether connection portion 61B. The shape of the bag body 51B in the small protrusion amount mode SP is defined such that the tether connection portion 61B comes close to the opening-side portion 55b on the side of the inlet port 53 in the inner peripheral surface 55a of the tubular inflation portion 55B. The shape of the bag body 51B in the large protrusion amount mode MP is defined such that the tether connection portion 61B is further moved rearward with respect to the opening-side portion 55b of the tubular inflation portion 55B, as compared with the case of the small protrusion amount mode SP.

Further, in the occupant protection device 10B of the third embodiment, in the small protrusion amount mode SP, the bag body 51B can receive the occupant OP in the normal position by a substantially planar receiving portion 57B, as shown in FIG. 7. In the large protrusion amount mode MP, the bag body 51B can receive the occupant OP by a receiving portion 58B coming closer to the tether connection portion 61B than the receiving portion 57B, as shown in FIG. 8.

Meanwhile, the occupant OP shown in FIG. 8 is the occupant OP who is seated on the seat 4 in a state where the backrest portion 4a is tilted rearward and who is seated in a relaxed posture leaned back, that is, in a comfortable posture. The bag body 51B can properly receive and protect even such an occupant OP.

Further, in the occupant protection device 10A of the second embodiment, the bag body 51 of the airbag 50 is inflated to form the inverted U-shaped tubular inflation portion 55. However, as in a bag body 51C of an airbag 50C of an occupant protection device 10C of the fourth embodiment shown in FIGS. 9 and 10, a tubular inflation portion 55C may be configured to inflate in a substantially U shape vertically inverted, that is, a substantially inverted U shape. Also in this airbag 50C, in the small protrusion amount mode SP, the root portion 67 of the tether 65C is locked by the lock pin 17 of the actuator 16 as a length adjustment unit. In the large protrusion amount mode MP, the locking of the lock pin 17 is released, and the tether 65C is released. The tether 65C is arranged so that the leading end 66 is connected to the leading end (rear end) 55c of the tubular inflation portion 55C and the root portion 67 passes through the lower side of the bag body 51C. The lock pin 17 of the actuator 16 as a length adjustment unit provided on the side of a rear edge 12b in the storage position 12 is inserted into the connection hole 67a and the tether 65C is locked by the lock pin 17.

At the time of completion of inflation in the small protrusion amount mode SP, the bag body 51C also has the tubular inflation portion 55C curved in a substantially U shape vertically inverted, that is, in a substantially inverted U shape from the storage position 12 toward the tether connection portion 61C. The shape of the bag body 51C in the small protrusion amount mode SP is defined such that the tether connection portion 61C comes close to the opening-side portion 55b on the side of the inlet port 53 in the inner peripheral surface 55a of the tubular inflation portion 55C. The shape of the bag body 51C in the large protrusion amount mode MP is defined such that the tether connection portion 61C is further moved rearward with respect to the opening-side portion 55b of the tubular inflation portion 55C, as compared with the case of the small protrusion amount mode SP.

Figure 9:
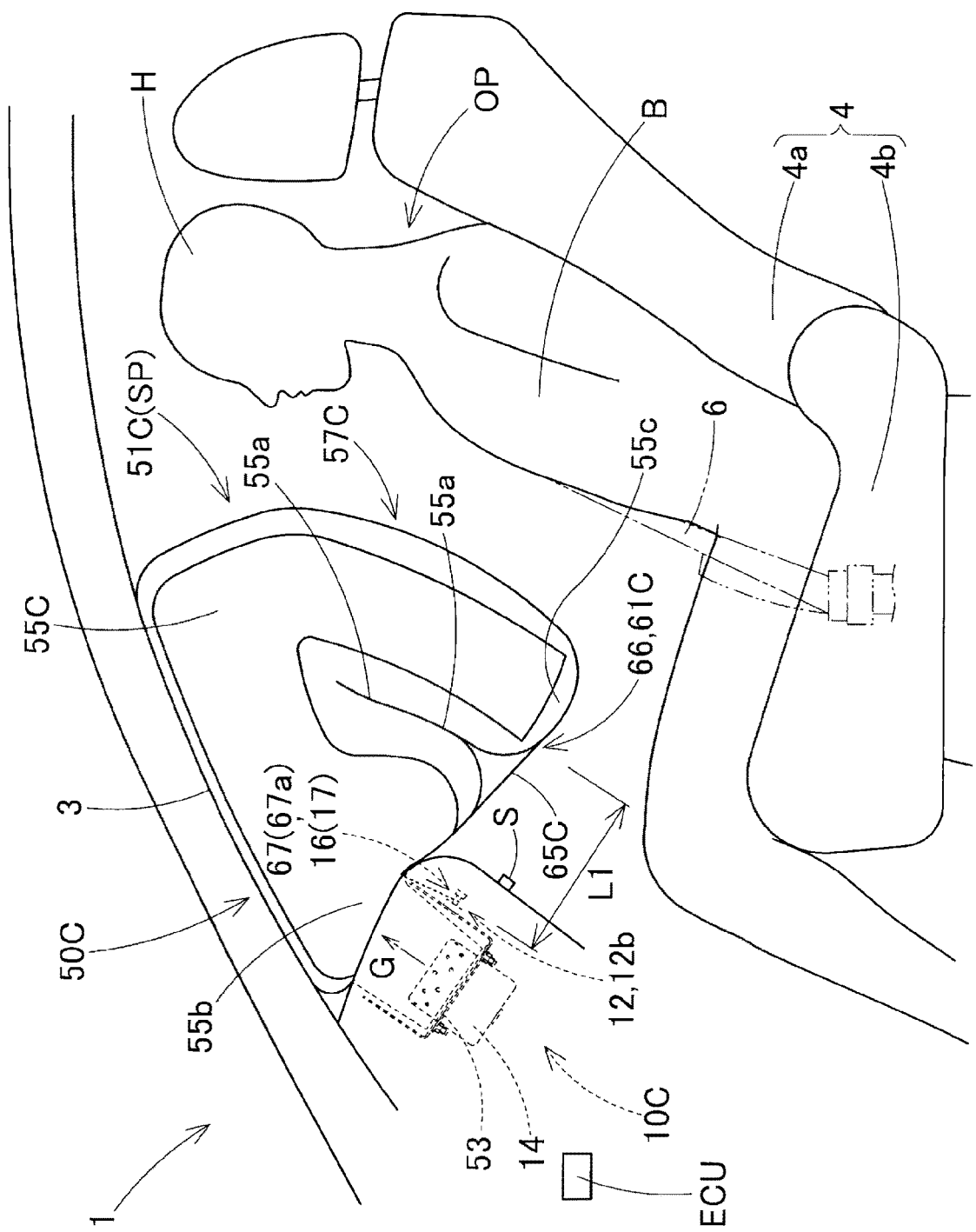
FIG. 9 is a view showing an operating state of an occupant protection device according to a fourth embodiment and is a schematic side view showing a state in which an airbag completes inflation in a small protrusion amount mode.
Figure 10:
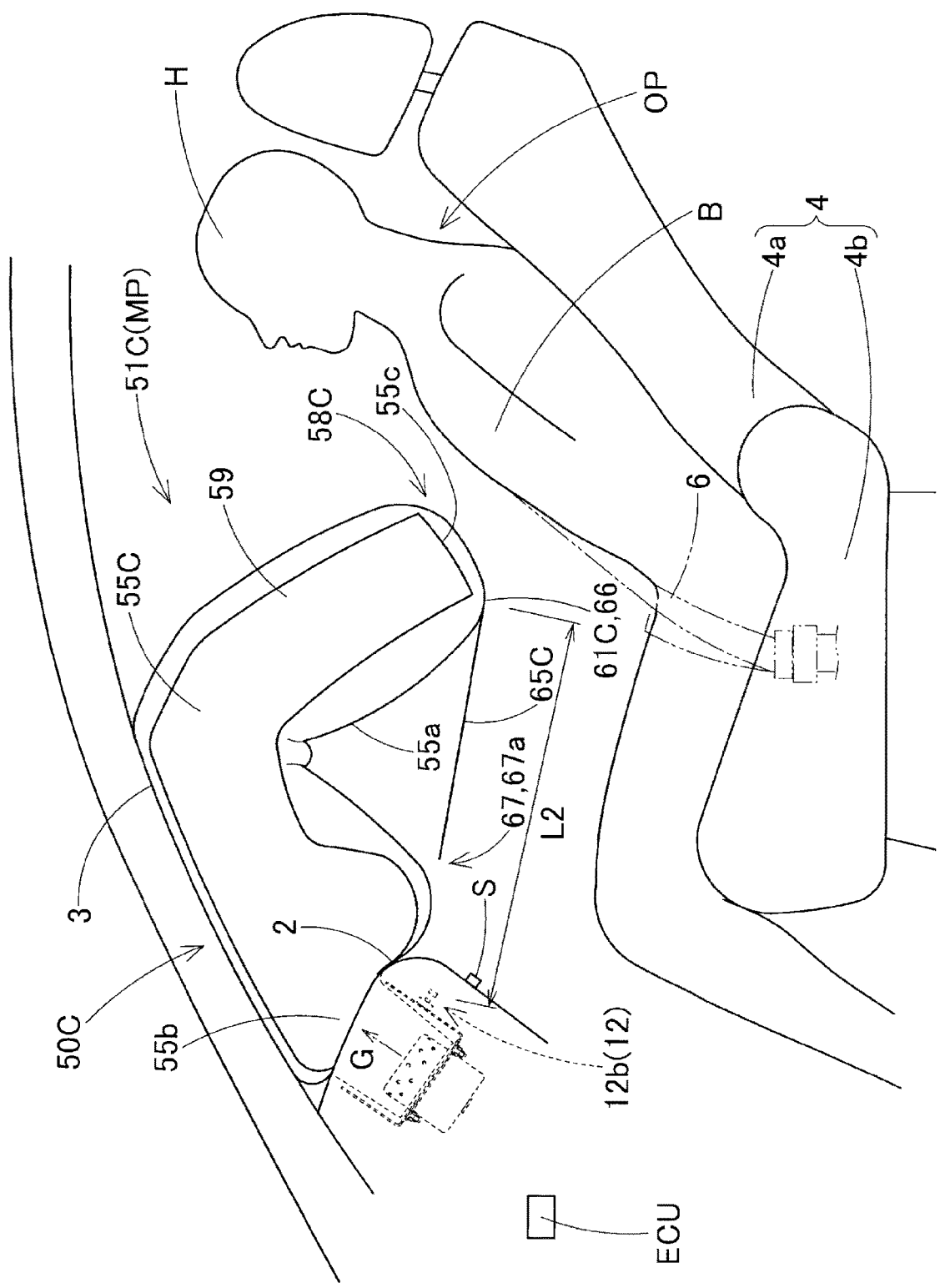
FIG. 10 is a view showing an operating state of the occupant protection device according to the fourth embodiment and is a schematic side view showing a state in which the airbag completes inflation in a large protrusion amount mode.

Further, in the occupant protection device 10C of the fourth embodiment, in the small protrusion amount mode SP, the bag body 51C can receive the occupant OP in the normal position by a substantially planar receiving portion 57C, as shown in FIG. 9. In the large protrusion amount mode MP, the bag body 51C can receive the occupant OP in a comfortable posture located on the rear side of the occupant OP (see FIG. 9) in the normal position by a receiving portion 58C in the vicinity of the rear end 55c, as shown in FIG. 10.

Meanwhile, the occupant OP in a comfortable posture can be properly received even at the time of completion of inflation of the bag bodies 21, 51 of the first and second embodiments in the large protrusion amount mode MP.

Further, as the tubular inflation portions 30, 31, 55, 55B, 55C of the bag bodies 21, 51, 51B, 51C of the respective embodiments, those having a curved shape as viewed from the right and left direction of the vehicle 1 have been exemplified. However, the tubular inflation portion may be configured to have a curved shape as viewed from the upper and lower direction of the vehicle 1.

Figure 11:
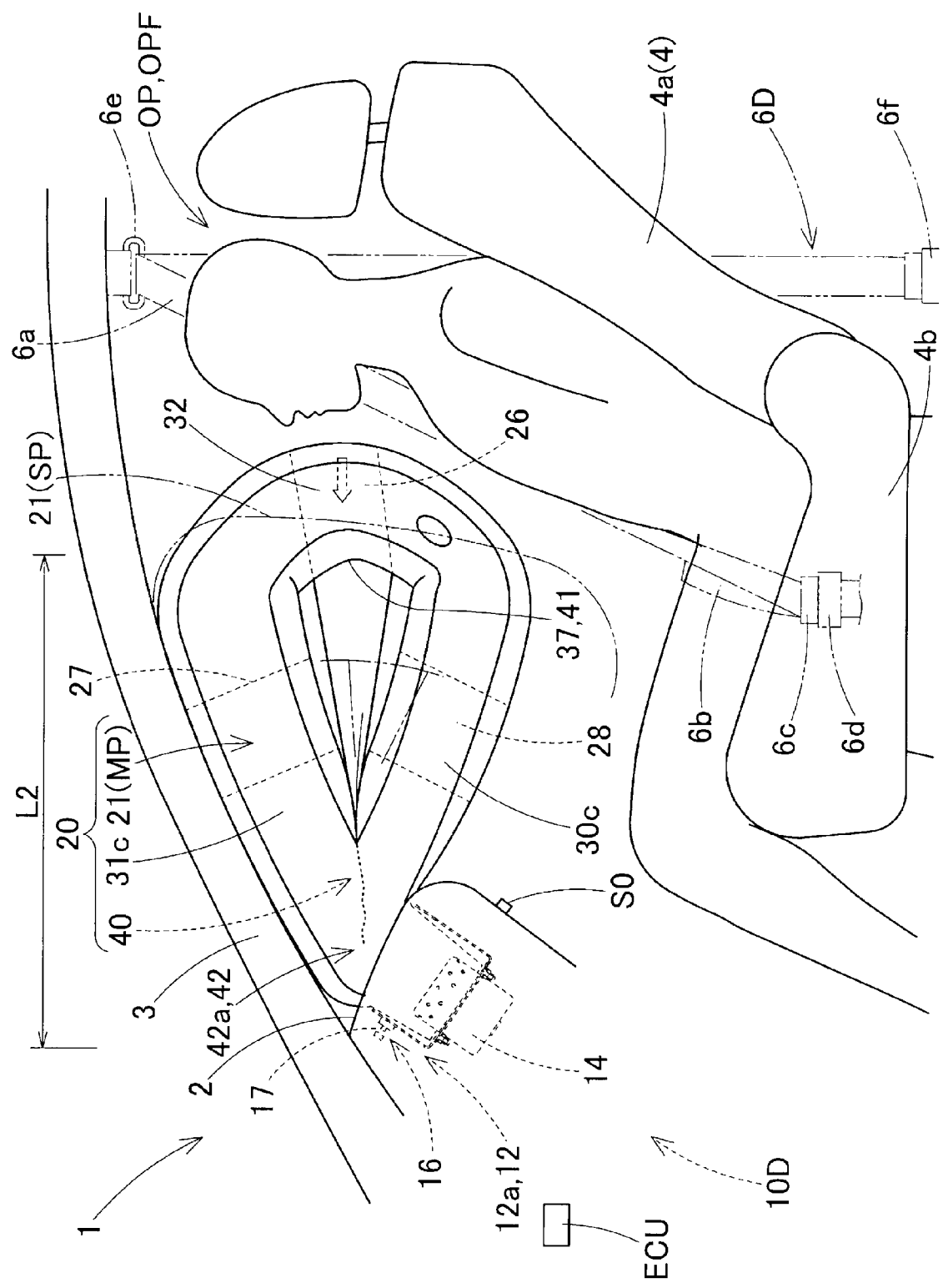
FIG. 11 is a view showing an operating state of an occupant protection device according to a fifth embodiment and is a schematic side view when an occupant is a large occupant.
Figure 12:
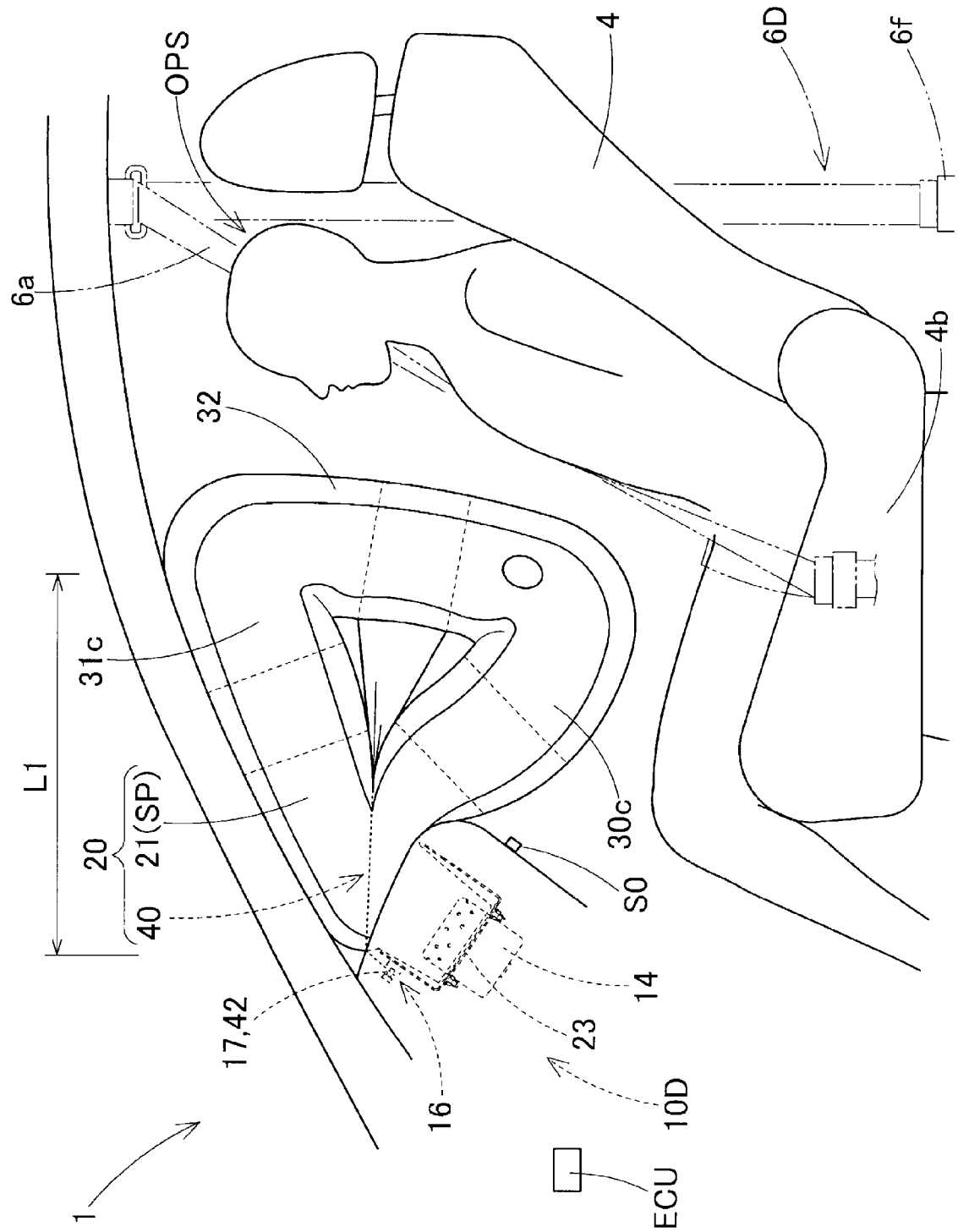
FIG. 12 is a view showing an operating state of the occupant protection device according to the fifth embodiment and is a schematic side view when an occupant is a small occupant.

Next, an occupant protection device 10D according to a fifth embodiment shown in FIGS. 11 and 12 includes the airbag 20, the inflator 14 for supplying inflation gas to the airbag 20, and the actuator 16 as a length adjustment unit for adjusting the length of the tether 40, as the configuration similar to the occupant protection device 10 according to the first embodiment. That is, the airbag 20 at the time of inflation completes inflation in the large protrusion amount mode MP when the actuator 16 pulls the lock pin 17 from the connection hole 42a. Further, the airbag 20 at the time of inflation completes inflation in the small protrusion amount mode SP when the lock pin 17 is kept inserted into the connection hole 42a.

Further, the fifth embodiment is configured to include a seat belt device 6D which has a winding mechanism 6f provided with a pre-tensioner mechanism and a force limiter mechanism for restraining the occupant OP (OPF, OPS) seated on the seat 4, and a camera SO which serves as an occupant detection unit capable of detecting whether the occupant seated on the seat 4 is a large occupant OPF or a small occupant OPS.

The seat belt device 6D is configured such that the shoulder belt 6a is connected to the winding mechanism 6f via a guide 6e and the tensile force of the shoulder belt 6a can be adjusted in two high and low steps (e.g., 4 KN and 3 KN) at the time of vehicle collision. Further, this adjustment is performed by the control of the control device ECU.

Further, at the time of collision of the vehicle 1, the control device ECU controls the operation of the inflator 14 that supplies inflation gas to the airbag 20 and detects whether the speed of the vehicle 1 is a high speed (e.g., 55 km/h or more) or a medium to low speed (less than 55 km/h). Further, as shown in FIG. 13, the control device ECU controls the adjustment (the adjustment of the large and small protrusion amount modes) at the time of operation of the actuator 16 as a length adjustment unit and the adjustment of the tensile force level in the winding mechanism 6f of the seat belt device 6D depending on whether the occupant is the large occupant OPF or the small occupant OPS based on a signal (image data) from the camera SO as an occupant detection unit.

That is, when the control device ECU detects the collision of the vehicle 1 and controls the inflator 14 to operate, the control device ECU operates the actuator 16 as a length adjustment unit to adjust the protrusion amount to the large protrusion amount mode MP when it is determined by the camera SO as an occupant detection unit that the occupant OP seated on the seat 4 is the large occupant OPF, as shown in FIG. 11. Further, at that time, when it is detected that the speed of the vehicle 1 is a high speed, the control device ECU adjusts the winding mechanism 6f of the seat belt device 6D to adjust the tensile force of the shoulder belt 6a as a high tensile force.

Therefore, the airbag 20 has a long rearward protrusion length. The airbag 20 approaches the large occupant OPF seating in a state away from the storage position 12 and completes inflation to receive the large occupant OPF moving forward. Further, the airbag 20 can move close to the shape in the small protrusion amount mode SP and smoothly receive and protect the large occupant OPF even when the amount of energy of the large occupant OPF moving forward is large. At this time, when the vehicle 1 is colliding at high speed, the control device ECU increases the tensile force of the shoulder belt 6a of the seat belt device 6D and pulls the shoulder belt 6a applied to the large occupant OPF. In this way, the forward movement of the large occupant OPF with high kinetic energy can be accurately suppressed.

Meanwhile, when the speed of the vehicle 1 at the time of collision is a medium to low speed, the control device ECU lowers the tensile force of the shoulder belt 6a by the winding mechanism 6f of the seat belt device 6D and pulls the shoulder belt 6a applied to the large occupant OPF. In this way, the forward movement of the large occupant OPF with relatively low kinetic energy can be accurately suppressed.

Further, when the control device ECU detects the collision of the vehicle 1 and controls the inflator 14 to operate, the control device ECU adjusts the protrusion amount to the small protrusion amount mode SP without operating the actuator 16 as a length adjustment unit when it is determined by the camera SO as an occupant detection unit that the occupant OP seated on the seat 4 is the small occupant OPS, as shown in FIG. 12. Further, at that time, when it is detected that the speed of the vehicle 1 is a high speed, the control device ECU adjusts the winding mechanism 6f of the seat belt device 6D to adjust the tensile force of the shoulder belt 6a as a high tensile force.

Therefore, the airbag 20 has a short rearward protrusion length. The airbag 20 approaches the small occupant OPS seating in a state close to the storage position 12 and completes inflation to receive and protect the small occupant OPS moving forward. At this time, when the vehicle 1 is colliding at high speed, the control device ECU increases the tensile force of the shoulder belt 6a of the seat belt device 6D and pulls the shoulder belt 6a applied to the small occupant OPS. In this way, the forward movement of the small occupant OPS with high kinetic energy can be accurately suppressed.

Meanwhile, when the speed of the vehicle 1 at the time of collision is a medium to low speed, the control device ECU lowers the tensile force of the shoulder belt 6a of the seat belt device 6D and pulls the shoulder belt 6a applied to the small occupant OPS. In this way, the forward movement of the small occupant OPS with relatively low kinetic energy can be accurately suppressed.

That is, in the occupant protection device 10D according to the fifth embodiment, the occupant OP (OPF, OPS) can be accurately protected in accordance with the physique of the occupant OP (OPF, OPS) and the speed of the vehicle 1.

Figure 14:
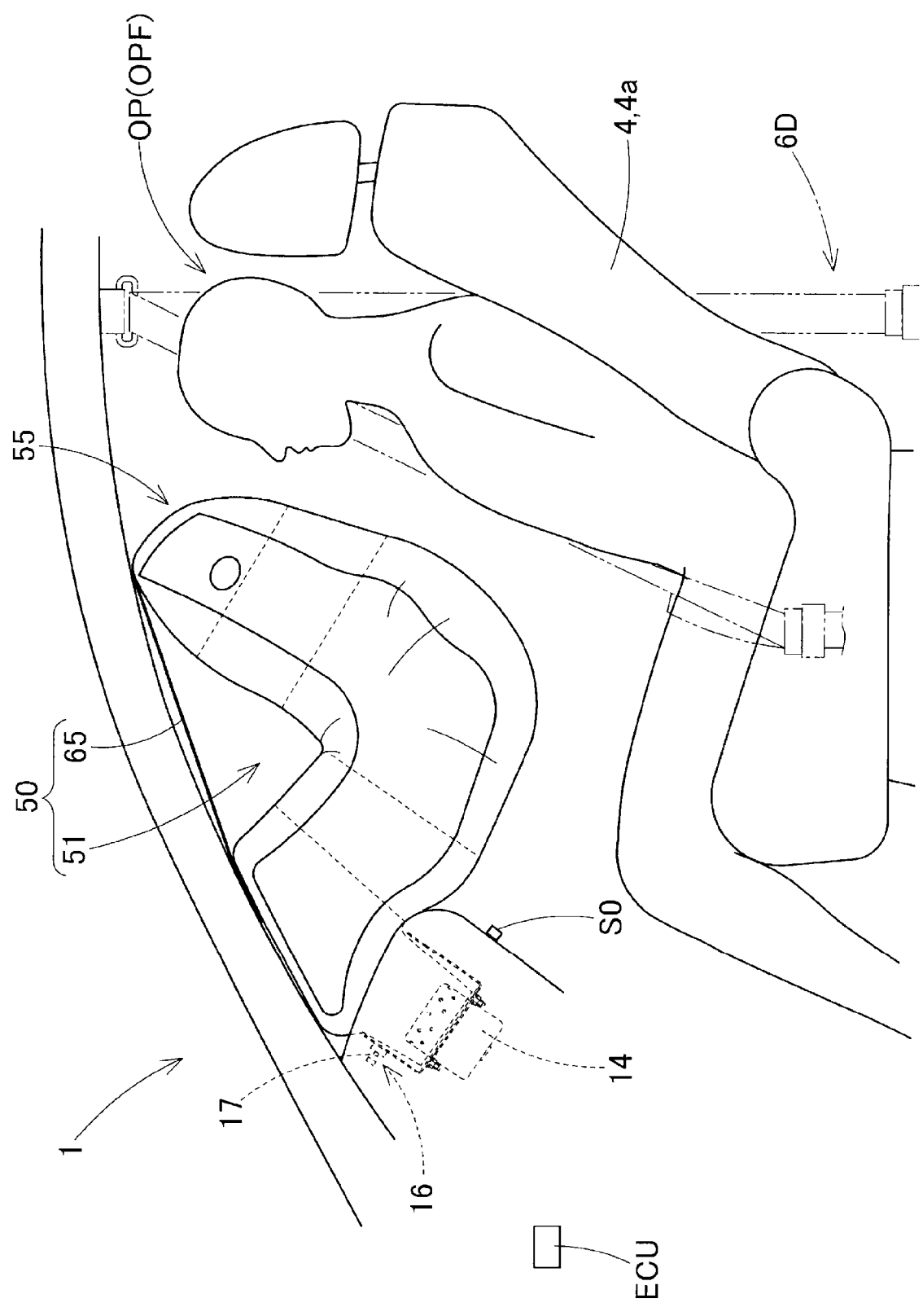
FIG. 14 is a schematic side view showing a modification of the fifth embodiment.

Meanwhile, in the occupant protection device 10D according to the fifth embodiment, the looped airbag 20 is used. However, as shown in FIG. 14, the airbag 50 used in the second embodiment may be used, and the control device ECU may determine whether the occupant seated on the seat 4 is the large occupant OPF or the small occupant OPS by an image from the camera SO as an occupant detection unit and control the operation of the actuator 16 as a length adjustment unit. Further, the control device ECU may adjust the tensile force of the shoulder belt 6a of the seat belt device 6D according to the speed of the vehicle 1 to protect the occupant OP (OPF, OPS). Naturally, instead of the airbags 20, 50, the airbag 50B shown in FIGS. 7 and 8 may be used, or the airbag 50C shown in FIGS. 9 and 10 may be used.

Figure 15:
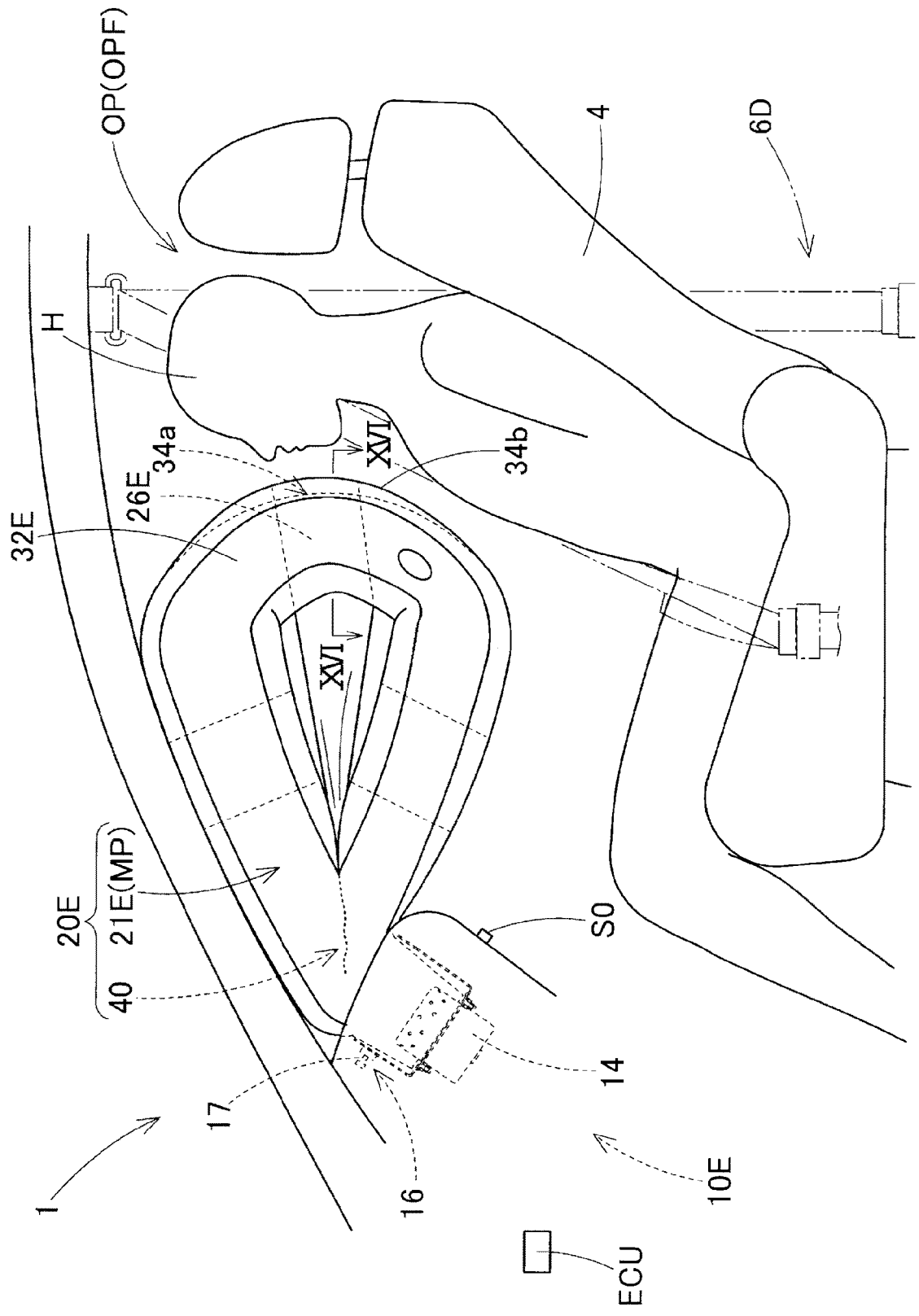
FIG. 15 is a schematic side view showing an operating state of an occupant protection device according to a sixth embodiment.
Figure 16:
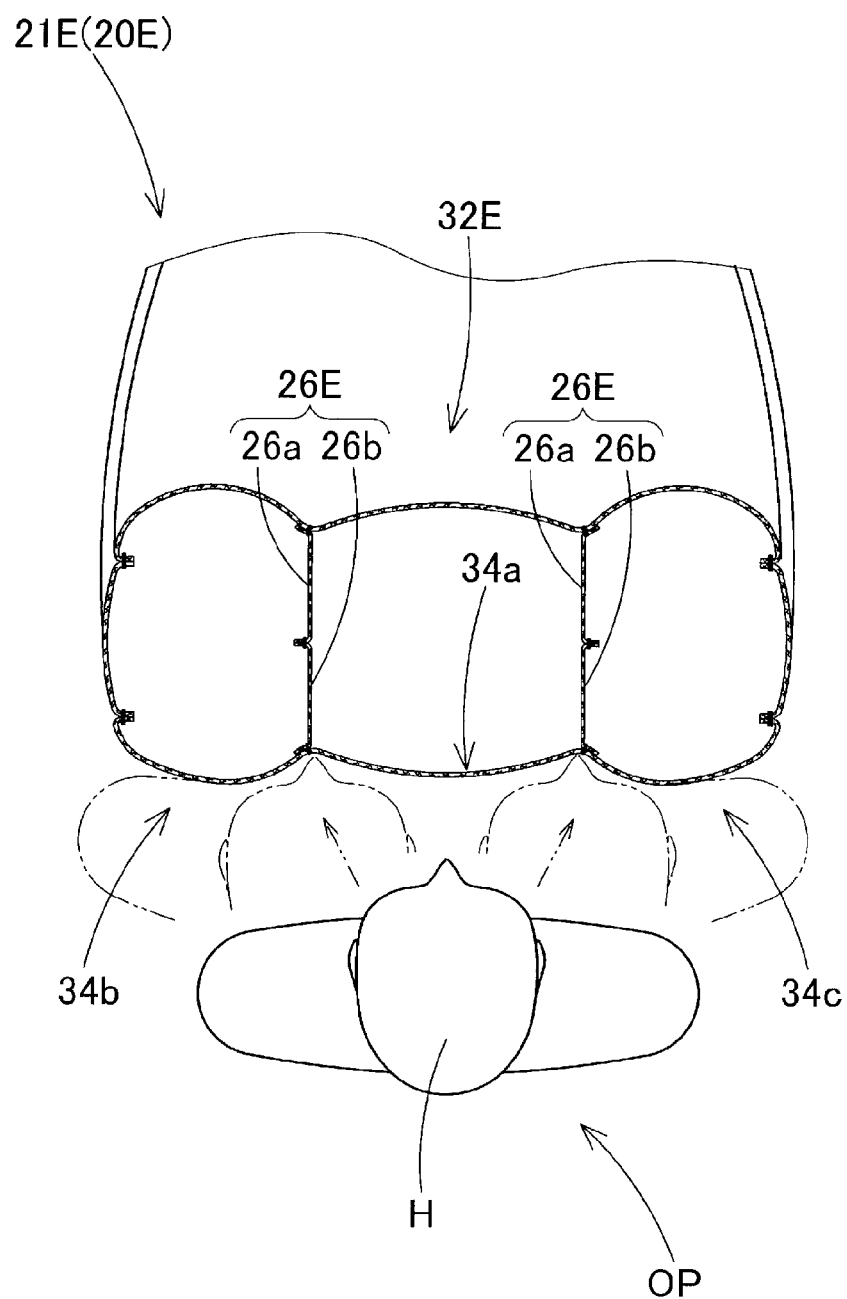
FIG. 16 is a partial sectional view taken along the portion XVI-XVI in FIG. 15.
Figure 17:
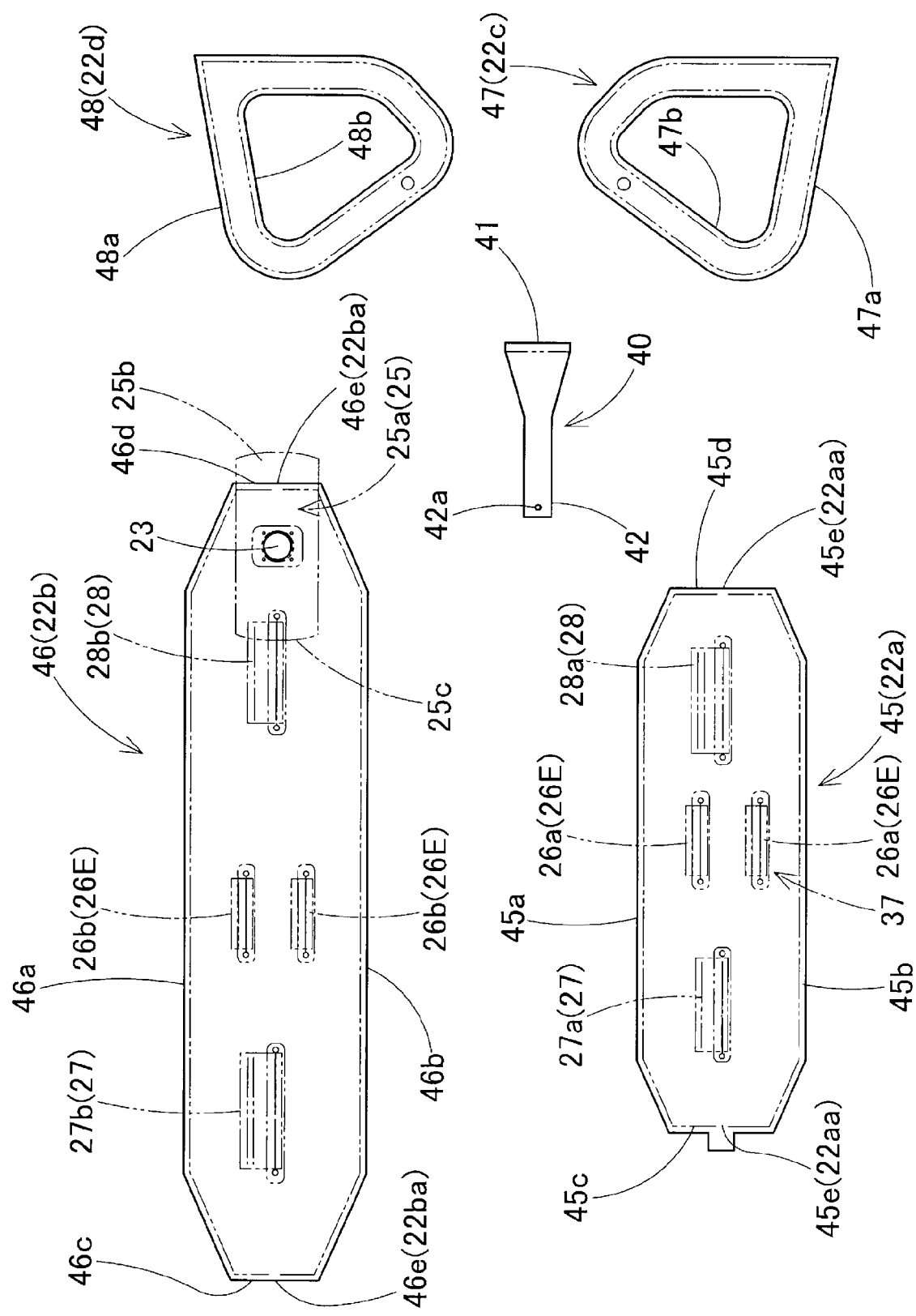
FIG. 17 is a plan view showing constituent materials of an airbag in the sixth embodiment.

Further, when the looped airbag 20 of the first and fifth embodiments is used, an occupant protection device 10E according to a sixth embodiment shown in FIGS. 15 to 17 may be used. In this sixth embodiment, a bag body 21E of an airbag 20E is configured such that connecting pieces 26E provided in a rear portion 32E are arranged side by side at an interval on both left and right sides. In the bag body 21E at the time of completion of inflation, the rear portion 32E for receiving the occupant OP has a shape in which a left portion 34b and a right portion 34c on both edge sides in the right and left direction further protrude rearward than a central portion 34a in the right and left direction. That is, in the rear portion 32E, the connecting pieces 26E formed by the inner fabrics 26a and the outer fabrics 26b are disposed apart in the right and left direction while being approached to a certain extent so that the left portion 34b and the right portion 34c on both edge sides in the right and left direction further protrude rearward than the central portion 34a in the right and left direction.

Therefore, in the occupant protection device 10E according to the sixth embodiment, the head H of the occupant OP can be received by the left portion 34b and the right portion 34c on both left and right sides protruding rearward from the central portion 34a even when the occupant OP is moved diagonally forward at the time of oblique collision or the like. In this manner, the occupant OP can be properly protected even at the time of oblique collision or the like.

Meanwhile, in the occupant protection device 10E, the configuration of the bag body 21E of the airbag 20E in which two connecting pieces 26E, 26E are arranged side by side in the right and left direction is different from that of the fifth embodiment, but the other configurations are the same as those of the fifth embodiment (see FIG. 17).

Further, in the first and fifth embodiments, the bag body 21 at the time of completion of inflation is configured such that the connecting pieces 26, 27, 28 for restricting the separation distance between the inner wall 22a and the outer wall 22b of the tubular inflation portions 30, 31 are respectively disposed with substantially equal length dimensions inside the upper portion 31c, the lower portion 30c, and the rear portion 32. However, the length dimensions of the respective connecting pieces 26, 27, 28 may be changed as appropriate.

Figure 18:
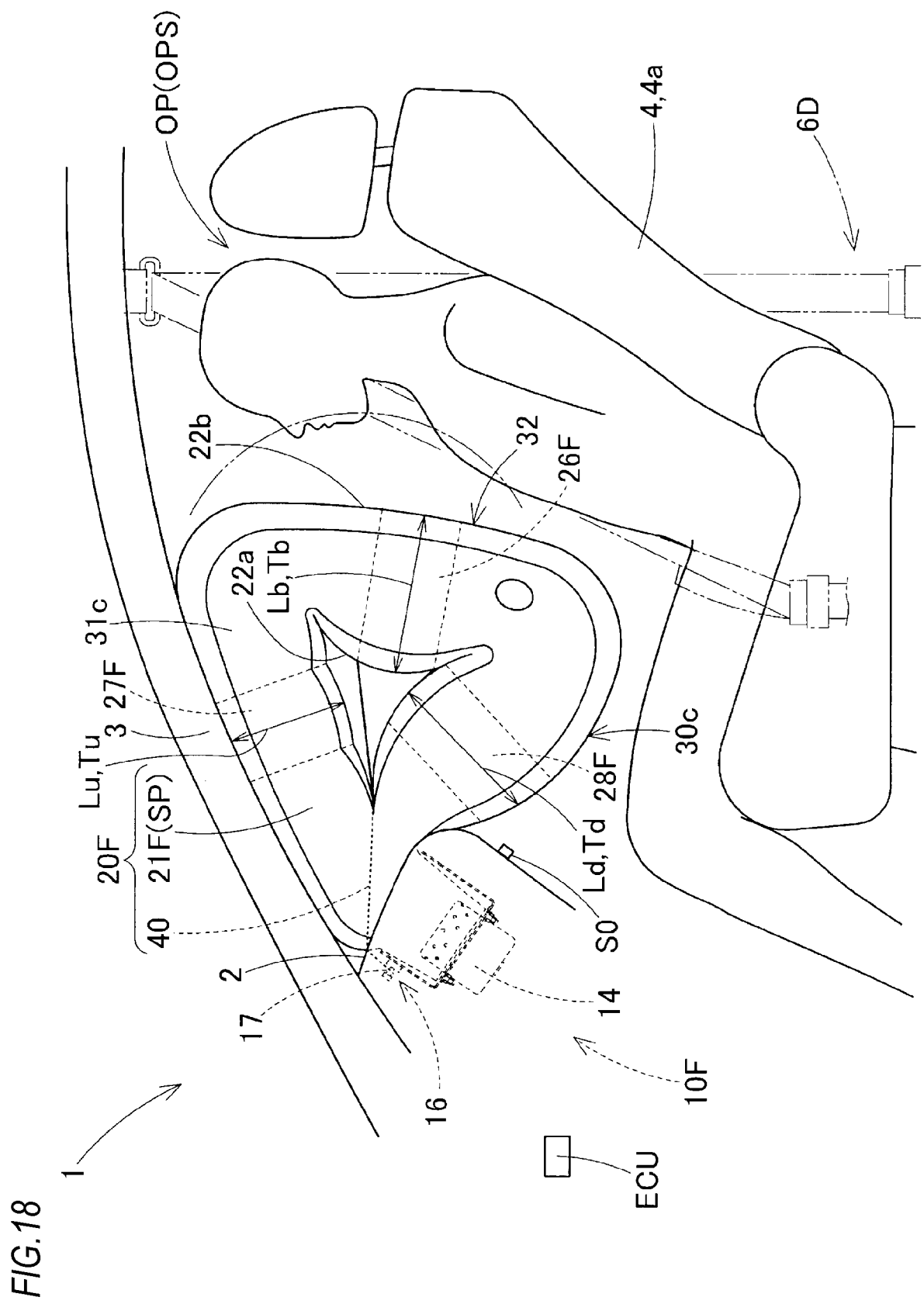
FIG. 18 is a schematic side view showing an operating state of an occupant protection device according to a seventh embodiment.

For example, in a bag body 21F of an airbag 20F of an occupant protection device 10F according to a seventh embodiment shown in FIG. 18, length dimensions Ld, Lb of the connecting piece 28, 26 of the lower portion 30c and the rear portion 32 are set to be longer than a length dimension Lu of a connecting piece 27F of the upper portion 31c.

In the occupant protection device 10F according to the seventh embodiment, when the bag body 21F is inflated or receives an occupant, a thickness dimension Tu of the upper portion 31c can be reduced, and therefore, a pressing force interfering with the windshield 3 can be reduced.

Figure 19:
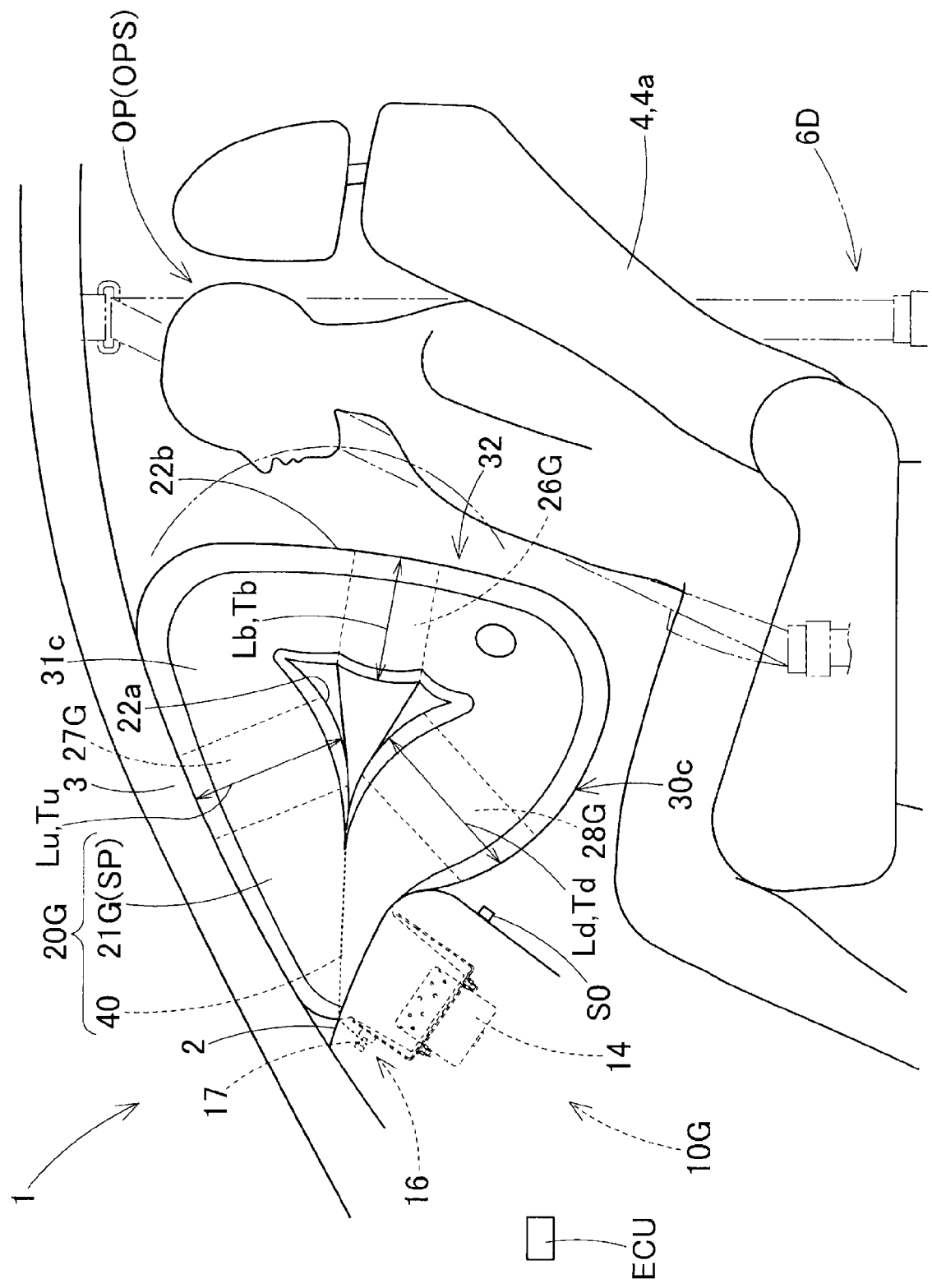
FIG. 19 is a schematic side view showing an operating state of an occupant protection device according to an eighth embodiment.

Alternatively, in a bag body 21G of an airbag 20G of an occupant protection device 10G according to an eighth embodiment shown in FIG. 19, the length dimensions Lu, Ld of the connecting pieces 27, 28 of the upper portion 31c and the lower portion 30c are set to be longer than the length dimension Lb of the connecting piece 26 of the rear portion 32.

Therefore, in the occupant protection device 10G according to the eighth embodiment, when the bag body 21G is inflated or receives an occupant, a thickness dimension Tb of the rear portion 32 can be reduced and the rear portion 32 can be easily flexed, and therefore, a reaction force on the occupant OP when receiving the occupant OP can be reduced.

Figure 20:
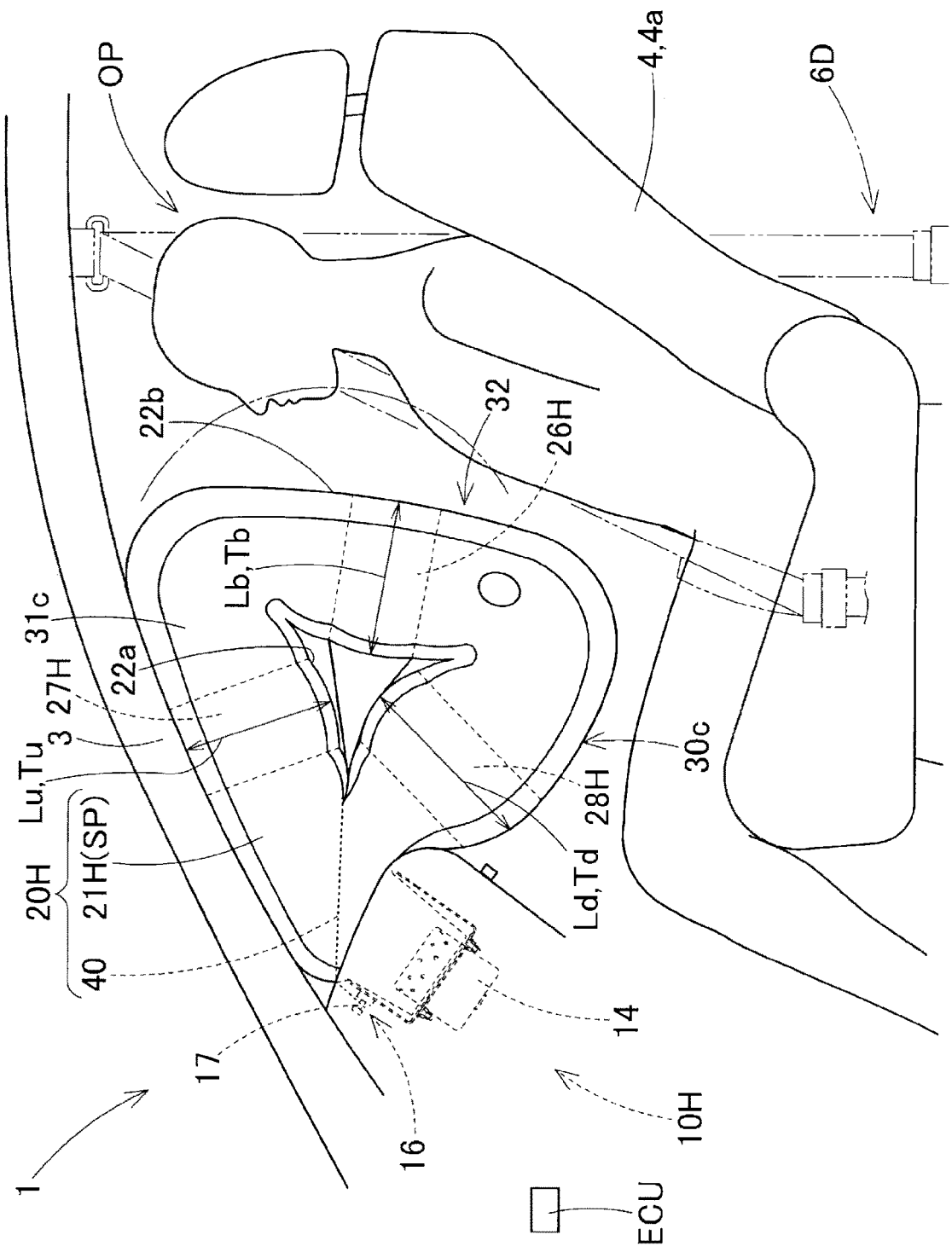
FIG. 20 is a schematic side view showing an operating state of an occupant protection device according to a ninth embodiment.

Alternatively, in a bag body 21H of an airbag 20H of an occupant protection device 10H according to a ninth embodiment shown in FIG. 20, the length dimensions Ld, Lb of the connecting pieces 27, 26 of the upper portion 31c and the rear portion 32 are set to be shorter than the length dimension Ld of the connecting piece 28 of the lower portion 30c. In the occupant protection device 10H according to the ninth embodiment, when the bag body 21H is inflated or receives an occupant, a thickness dimension Td of the lower portion 30c as a portion supported by the instrument panel 2 is increased, and therefore, a reaction force from the instrument panel 2 when receiving the occupant OP can be further stabilized.

Meanwhile, in the occupant protection devices 10F, 10G, 10H according to the seventh, eighth and ninth embodiments, the configurations of the bag bodies 21F, 21H, 21G in which the length dimensions of the connecting pieces 26, 27, 28 are different from each other are different from those of the fifth embodiment, but the other configurations are the same as those of the fifth embodiment.

Figure 21:
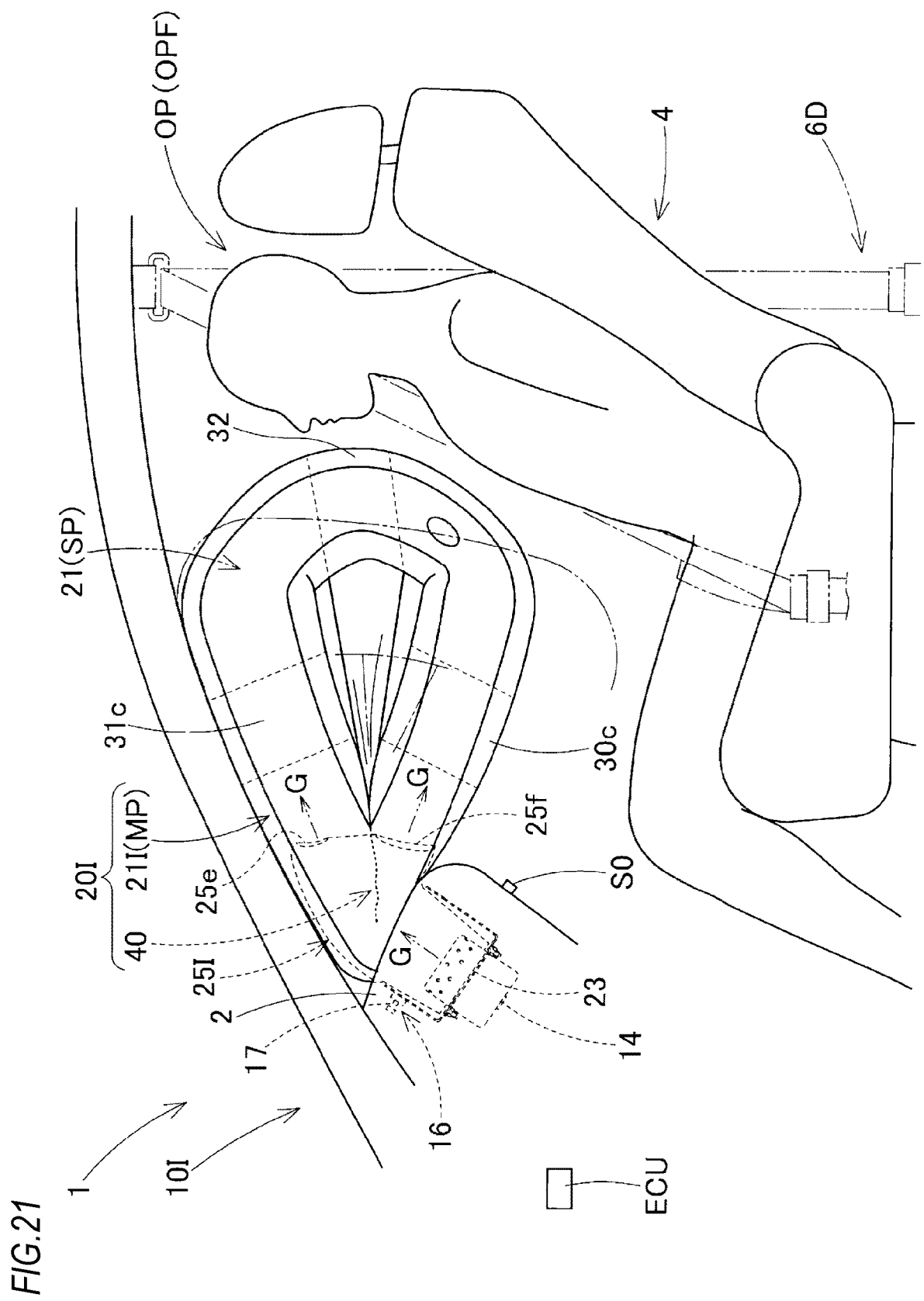
FIG. 21 is a schematic side view showing an operating state of an occupant protection device according to a tenth embodiment.

Furthermore, the configuration of an airbag 20I of an occupant protection device 10I according to a tenth embodiment shown in FIG. 21 may be adopted. In this airbag 20I, a bag body 21I at the time of completion of inflation is formed in a loop shape and has the upper portion 31c, the lower portion 30c, and the rear portion 32. Further, a rectifying fabric 251 is disposed above the inlet port 23.

Figure 22:
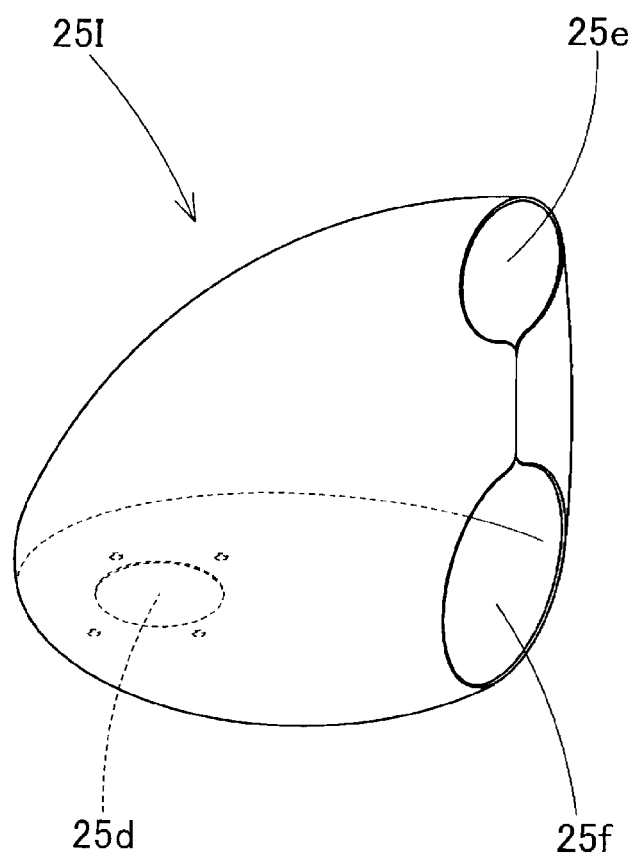
FIG. 22 is a schematic perspective view showing a rectifying fabric disposed inside a bag body in the tenth embodiment.

As shown in FIG. 22, the rectifying fabric 251 has an inlet port 25d communicating with the inlet port 23 and has an upper outlet port 25e and a lower outlet port 25f capable of causing the inflation gas G introduced from the inlet port 23 to flow to the upper portion 31c and the lower portion 30c. Further, the rectifying fabric 251 is configured so that an opening area of the lower outlet port 25f is set to be larger than an opening area of the upper outlet port 25e.

In the occupant protection device 10I according to the tenth embodiment, when the inflation gas G from the inflator 14 flows into the airbag 20I via the inlet ports 23, 25d during operation, the inflation gas G flows into the upper portion 31c from the upper outlet port 25e of the rectifying fabric 251 and flows into the lower portion 30c from the lower outlet port 25f, and merges at the rear portion 32.

At that time, since the rectifying fabric 251 is configured so that the opening area of the lower outlet port 25*f* is set to be larger than that of the upper outlet port 25*e*, a large amount of inflation gas G can flow to the side of the lower portion 30*c* to rapidly inflate the lower portion 30*c* supported by the instrument panel 2. Further, the support of the instrument panel 2 immediately after the completion of inflation is stabilized and the bag body 21I can properly receive the occupant OP.

Meanwhile, in the occupant protection device 10I according to the tenth embodiment, the configuration of the airbag 20I in which the rectifying fabric 251 is disposed inside the bag body 21I is different from that of the fifth embodiment, but the other configurations are the same as those of the fifth embodiment.

According to an aspect of the invention, there is provided an occupant protection device comprising: an airbag which is folded and stored on a front side of a seated occupant in a vehicle, is capable of receiving the occupant at a time of inflow of inflation gas and is deployed and inflated rearward from a storage position, wherein the airbag is deployed and inflated with an amount of protrusion from the storage position to a rear side in an inflation completed state of the airbag in at least two modes of a large protrusion amount mode and a small protrusion amount mode, the airbag includes a bag body which has an inlet port for introducing the inflation gas and in which a peripheral edge of the inlet port is fixedly disposed on the storage position side, and a tether which has a leading end connected to the bag body and a root portion side connected to the storage position side, the tether is connected to a length adjustment unit provided on the storage position side so that a distance from the storage position to which the root portion side is connected to a tether connection portion of the bag body at a time of completion of inflation to which the leading end is connected can be adjusted to two short and long modes of a first distance and a second distance longer than the first distance so as to correspond to the large protrusion amount mode and the small protrusion amount mode, the bag body has a tubular inflation portion curved in a substantially U shape from the storage position toward the tether connection portion at the time of completion of inflation in the small protrusion amount mode, a shape of the bag body in the small protrusion amount mode is defined such that the tether connection portion comes close to the inlet port side on an inner peripheral surface side of the tubular inflation portion, and a shape of the bag body in the large protrusion amount mode is defined such that the tether connection portion is further moved rearward with respect to the inlet port side on the inner peripheral surface side of the tubular inflation portion, as compared with the case of the small protrusion amount mode.

In the occupant protection device according to the present invention, when the bag body is deployed and inflated while the distance from the storage position side of the tether to the tether connection portion of the bag body is adjusted as the first distance by the length adjustment unit, the tubular inflation portion completes the inflation as a shape in which the tether connection portion comes close to the inlet port side of the inner peripheral surface. Therefore, the bag body completes the deployment and inflation as the small protrusion amount mode. Further, when the bag body is deployed and inflated while the distance from the storage position side of the tether to the tether connection portion of the bag body is adjusted as the second distance by the length adjustment unit, the tubular inflation portion completes the inflation as a shape in which the tether connection portion side is further moved rearward with respect to the inlet port side of the inner peripheral surface, as compared with the case of the small protrusion amount mode. Therefore, the bag body completes the deployment and inflation as the large protrusion amount mode. Further, the small protrusion amount mode and the large protrusion amount mode are set by strongly curving the curved state of the curved tubular inflation portion or loosening the degree of curving thereof. Specifically, the small protrusion amount mode is set when the curved state is strongly curved, and the large protrusion amount mode is set when the curved state is loosened. The influence of increase and decrease of volume itself is suppressed, so that the bag body can be deployed and inflated as the small protrusion amount mode or the large protrusion amount mode just by adjusting the curved state of the tubular inflation portion.

Therefore, in the occupant protection device according to the present invention, even when the protrusion amount of the bag body in the airbag is variable, the protrusion amount of the airbag can be adjusted while the increase in the capacity of the bag body itself is suppressed.

The tubular inflation portion may include a plurality of tubular inflation portions, and the bag body may be configured so that the plurality of tubular inflation portions are branched from the inlet port side and merge near the tether connection portion on the leading end side at the time of completion of inflation.

In such a configuration, when the deployment and inflation of the bag body in the small protrusion amount mode is completed, the vicinity of the tether connection portion becomes the merging portion of a plurality of tubular inflation portions and is pulled by the tether, thereby forming a planar portion. The planar portion can receive the occupant over a wide area and can be bent and deformed to receive and protect the occupant. Further, when the deployment and inflation of the bag body in the large protrusion amount mode is completed, the vicinity of the tether connection portion protrudes rearward to form a small planar portion. However, when receiving the occupant by the small planar portion, the portions of the plurality of tubular inflation portions extending forward from the planar portion are arranged in a columnar shape substantially along the front and rear direction, and hence, the occupant can be received and protected by the buckling of columnar support portions thereof.

A portion of the tether from the leading end side to the root portion side may be passed through the bag body and connected to the length adjustment unit.

In such a configuration, even when a plurality of tubular inflation portions are arranged to be branched into the plural from the vicinity of the inlet port disposed in the storage position, the tether extending from the tether connection portion is passed through the bag body and can be smoothly connected to the length adjustment mechanism disposed in the storage position.

The bag body at the time of completion of inflation may have an upper portion and a lower portion, which are branched up and down from the inlet port side, as a configuration in which the tubular inflation portions branched from the inlet port side is branched up and down from the inlet port side, and have a rear portion, which serves as a merging portion on the leading end side and a connection portion between rear ends of the upper portion and the lower portion, and the bag body may be configured to be inflated so as to extend rearward from a portion of an instrument panel in front of a passenger seat, which serves as the storage position, between the instrument panel and a windshield.

In such a configuration, when the bag body is inflated or receives an occupant, the lower portion can be supported by the instrument panel at least on the front side, and the upper portion can be supported by the windshield at least on the front side. In this manner, a sufficient reaction force when receiving the occupant by the rear portion can be secured from the instrument panel and the windshield, and the occupant can be suitably protected.

In the bag body at the time of completion of inflation, the rear portion for receiving the occupant may have a shape in which both edge sides in a right and left direction further protrude rearward than a central portion in the right and left direction.

In such a configuration, the head of the occupant can be received by the portions on both left and right sides protruding rearward from the central portion even when the occupant is moved diagonally forward at the time of oblique collision or the like. In this manner, the occupant can be properly protected even at the time of oblique collision or the like.

Further, when the bag body at the time of completion of inflation has the upper portion, the lower portion and the rear portion, connecting pieces for restricting a separation distance between an inner wall and an outer wall of the tubular inflation portions may be respectively disposed inside the upper portion, the lower portion and the rear portion.

In such a configuration, the bag body at the time of completion of inflation is restricted in the thickness dimensions of the upper portion, the lower portion, and the rear portion, so that the looped inflation-completed shape can be stabilized and the protection performance at the time of receiving the occupant can be stabilized.

Length dimensions of the connecting pieces for restricting the separation distance between the inner wall and the outer wall of the tubular inflation portions may be set so that the length dimensions of the connecting pieces of the lower portion and the rear portion are longer than the length dimension of the connecting piece of the upper portion.

In such a configuration, when the bag body is inflated, the thickness dimension of the upper portion can be reduced, and therefore, a pressing force interfering with the windshield can be reduced.

Length dimensions of the connecting pieces for restricting the separation distance between the inner wall and the outer wall of the tubular inflation portions may be set so that the length dimensions of the connecting pieces of the upper portion and the lower portion are longer than the length dimension of the connecting piece of the rear portion.

In such a configuration, when the bag body is inflated, the thickness dimension of the rear portion can be reduced, and therefore, a reaction force on the occupant when receiving the occupant can be reduced.

Length dimensions of the connecting pieces for restricting the separation distance between the inner wall and the outer wall of the tubular inflation portions may be set so that the length dimensions of the connecting pieces of the upper portion and the rear portion are shorter than the length dimension of the connecting piece of the lower portion.

In such a configuration, when the bag body is inflated, the thickness dimension of the lower portion as a portion supported by the instrument panel is increased, and therefore, a reaction force from the instrument panel when receiving the occupant can be further stabilized.

Further, when the bag body at the time of completion of inflation has the upper portion, the lower portion and the rear portion, a rectifying fabric having an upper outlet port and a lower outlet port capable of causing inflation gas introduced from the inlet port to flow to the upper portion and the lower portion may be disposed above the inlet port, and an opening area of the lower outlet port may be set to be larger than an opening area of the upper outlet port.

In such a configuration, the lower portion supported by the instrument panel can be rapidly inflated. Therefore, the support of the instrument panel immediately after the completion of inflation is stabilized and the bag body can properly receive the occupant.

The tubular inflation portion may be one tubular inflation portion arranged to be curved from the storage position side to a portion of the tether connection portion at a leading end.

In such a configuration, when the deployment and inflation of the bag body in the small protrusion amount mode is completed, the vicinity of the tether connection portion is pulled by the tether. Therefore, the portion of the tubular inflation portion protruding rearward from the side of the inlet port to the vicinity of the tether connection portion can receive and protect the occupant. Further, when the deployment and inflation of the bag body in the large protrusion amount mode is completed, the curved state of the tubular inflation portion is loosened, and the portion shifted from the portion of receiving the occupant to the vicinity of the tether connection portion in the small protrusion amount mode can receive and protect the occupant.

The occupant protection device may include: a seat belt device provided with a pre-tensioner mechanism and a force limiter mechanism for restraining the occupant seated on a seat and capable of adjusting a tensile force of a belt restraining the occupant in at least two high and low steps at a time of operation; an occupant detection unit capable of detecting whether the occupant seated on the seat is a large occupant or a small occupant; and a control device capable of controlling an operation of an inflator for supplying the inflation gas to the airbag at a time of vehicle collision, capable of controlling adjustment at a time of operation of the length adjustment unit and adjustment of the tensile force of the seat belt device, and capable of detecting whether speed of the vehicle is a high speed or a medium to low speed, wherein, when controlling the inflator to operate, the control device adjusts the length adjustment unit to the large protrusion amount mode when the occupant detection unit determines that the occupant seated on the seat is a large occupant, and the control device adjusts the tensile force of the belt to a high tensile force when detecting that the speed of the vehicle is a high speed, and the control device adjusts the tensile force of the belt to a low tensile force when detecting that the speed of the vehicle is a medium to low speed, or the control device adjusts the length adjustment unit to the small protrusion amount mode when the occupant detection unit determines that the occupant seated on the seat is a small occupant, and the control device adjusts the tensile force of the belt to a high tensile force when detecting that the speed of the vehicle is a high speed, and the control device adjusts the tensile force of the belt to a low tensile force when detecting that the speed of the vehicle is a medium to low speed.

In such a configuration, when collision of a vehicle occurs in a state where a seated occupant is a large occupant, the control device operates the inflator to inflate the airbag and adjusts the length of the tether so that the length adjustment unit is set to the large protrusion amount mode while detecting that seated occupant is a large occupant by the occupant detection unit. Therefore, the airbag has a long rearward protrusion length. The airbag approaches the large occupant seating in a state away from the storage position and completes inflation to receive the large occupant moving forward. Further, the airbag can move close to the shape in the small protrusion amount mode and smoothly receive and protect the large occupant even when the amount of energy of the large occupant moving forward is large. At this time, when the vehicle is colliding at high speed, the control device increases the tensile force of the belt of the seat belt device and pulls the belt applied to the large occupant. In this way, the forward movement of the large occupant with high kinetic energy can be accurately suppressed. Further, when the speed of the vehicle at the time of collision is a medium to low speed, the control device lowers the tensile force of the belt of the seat belt device and pulls the belt applied to the large occupant. In this way, the forward movement of the large occupant with relatively low kinetic energy can be accurately suppressed.

Further, when collision of a vehicle occurs in a state where a seated occupant is a small occupant, the control device operates the inflator to inflate the airbag and adjusts the length of the tether so that the length adjustment unit is set to the small protrusion amount mode while detecting that seated occupant is a small occupant by the occupant detection unit. Therefore, the airbag has a short rearward protrusion length. The airbag approaches the small occupant seating in a state close to the storage position and completes inflation to receive and protect the small occupant moving forward. At this time, when the vehicle is colliding at high speed, the control device increases the tensile force of the belt of the seat belt device and pulls the belt applied to the small occupant. In this way, the forward movement of the small occupant with high kinetic energy can be accurately suppressed. Further, when the speed of the vehicle at the time of collision is a medium to low speed, the control device lowers the tensile force of the belt of the seat belt device and pulls the belt applied to the small occupant. In this way, the forward movement of the small occupant with relatively low kinetic energy can be accurately suppressed.

That is, the occupant protection device can appropriately protect an occupant according to the physique of an occupant and the speed of a vehicle.

What is claimed is:

1. An occupant protection device comprising:
   an airbag which is folded and stored on a front side of a seated occupant in a vehicle, is capable of receiving the occupant at a time of inflow of inflation gas and is deployed and inflated rearward from a storage position, wherein
   the airbag is deployed and inflated with an amount of protrusion from the storage position to a rear side in an inflation completed state of the airbag in at least two modes of a large protrusion amount mode and a small protrusion amount mode,
   the airbag includes a bag body which has an inlet port for introducing the inflation gas and in which a peripheral edge of the inlet port is fixedly disposed on the storage position side, and a tether which has a leading end connected to the bag body and a root portion side connected to the storage position side,
   the tether is connected to a length adjustment unit provided on the storage position side so that a distance from the storage position to which the root portion side is connected to a tether connection portion of the bag body at a time of completion of inflation to which the leading end is connected can be adjusted to two short and long modes of a first distance and a second distance longer than the first distance so as to correspond to the large protrusion amount mode and the small protrusion amount mode, wherein at least a portion of the tether from the root portion side to a leading end side of the tether is connected to the tether connection portion of the bag body through the outside of the airbag, and the tether is connected via an outside area of the airbag,
   the bag body has a tubular inflation portion curved in a substantially U shape from the storage position toward the tether connection portion at the time of completion of inflation in the small protrusion amount mode,
   a shape of the bag body in the small protrusion amount mode is defined such that the tether connection portion comes close to the inlet port side on an inner peripheral surface side of the tubular inflation portion,
   a shape of the bag body in the large protrusion amount mode is defined such that the tether connection portion is further moved rearward with respect to the inlet port side on the inner peripheral surface side of the tubular inflation portion, as compared with the case of the small protrusion amount mode, and
   the tether is locked by a lock pin of the length adjustment unit in such a manner that the leading end connected to the tether connection portion enters the bag body through a through-hole of an inner wall of the bag body in a state in which the root portion side is locked by the lock pin and protrudes to outside of the bag body through a through-hole of an outer wall of the bag body.

2. The occupant protection device according to claim 1, wherein
   the tubular inflation portion includes a plurality of tubular inflation portions, and
   the bag body is configured so that the plurality of tubular inflation portions are branched from the inlet port side and merge near the tether connection portion on the leading end side at the time of completion of inflation.

3. The occupant protection device according to claim 2, wherein
   the portion of the tether from the leading end side to the root portion side is passed through the bag body and connected to the length adjustment unit.

4. The occupant protection device according to claim 2, wherein
   the bag body at the time of completion of inflation has an upper portion and a lower portion, which are branched up and down from the inlet port side, as a configuration in which the tubular inflation portions branched from the inlet port side is branched up and down from the inlet port side, and has a rear portion, which serves as a merging portion on the leading end side and a connection portion between rear ends of the upper portion and the lower portion, and
   the bag body is configured to be inflated so as to extend rearward from a portion of an instrument panel in front of a passenger seat, which serves as the storage position, between the instrument panel and a windshield.

5. The occupant protection device according to claim 4, wherein
   in the bag body at the time of completion of inflation, the rear portion for receiving the occupant has a shape in which both edge sides in a right and left direction further protrude rearward than a central portion in the right and left direction.

6. The occupant protection device according to claim 4, wherein
    connecting pieces for restricting a separation distance between an inner wall and an outer wall of the tubular inflation portions are respectively disposed inside the upper portion, the lower portion, and the rear portion.

7. The occupant protection device according to claim 6, wherein
    length dimensions of the connecting pieces for restricting the separation distance between the inner wall and the outer wall of the tubular inflation portions are set so that the length dimensions of the connecting pieces of the lower portion and the rear portion are longer than the length dimension of the connecting piece of the upper portion.

8. The occupant protection device according to claim 6, wherein
    length dimensions of the connecting pieces for restricting the separation distance between the inner wall and the outer wall of the tubular inflation portions are set so that the length dimensions of the connecting pieces of the upper portion and the lower portion are longer than the length dimension of the connecting piece of the rear portion.

9. The occupant protection device according to claim 6, wherein
    length dimensions of the connecting pieces for restricting the separation distance between the inner wall and the outer wall of the tubular inflation portions are set so that the length dimensions of the connecting pieces of the upper portion and the rear portion are shorter than the length dimension of the connecting piece of the lower portion.

10. The occupant protection device according to claim 4, wherein
    a rectifying fabric having an upper outlet port and a lower outlet port capable of causing the inflation gas introduced from the inlet port to flow to the upper portion and the lower portion is disposed above the inlet port, and
    an opening area of the lower outlet port is set to be larger than an opening area of the upper outlet port.

11. The occupant protection device according to claim 1, wherein
    the tubular inflation portion is one tubular inflation portion arranged to be curved from the storage position side to a portion of the tether connection portion at a leading end.

12. The occupant protection device according to claim 1, wherein
    the occupant protection device includes:
    a seat belt device provided with a pre-tensioner mechanism and a force limiter mechanism for restraining the occupant seated on a seat and capable of adjusting a tensile force of a belt restraining the occupant in at least two high and low steps at a time of operation;
    an occupant detection unit capable of detecting whether the occupant seated on the seat is a large occupant or a small occupant; and
    a control device capable of controlling an operation of an inflator for supplying the inflation gas to the airbag at a time of vehicle collision, capable of controlling adjustment at a time of operation of the length adjustment unit and adjustment of the tensile force of the seat belt device, and capable of detecting whether speed of the vehicle is a high speed or a medium to low speed, wherein
    when controlling the inflator to operate,
    the control device adjusts the length adjustment unit to the large protrusion amount mode when the occupant detection unit determines that the occupant seated on the seat is a large occupant, and the control device adjusts the tensile force of the belt to a high tensile force when detecting that the speed of the vehicle is a high speed, and the control device adjusts the tensile force of the belt to a low tensile force when detecting that the speed of the vehicle is a medium to low speed, or
    the control device adjusts the length adjustment unit to the small protrusion amount mode when the occupant detection unit determines that the occupant seated on the seat is a small occupant, and the control device adjusts the tensile force of the belt to a high tensile force when detecting that the speed of the vehicle is a high speed, and the control device adjusts the tensile force of the belt to a low tensile force when detecting that the speed of the vehicle is a medium to low speed.

13. The occupant protection device according to claim 1, wherein
    the tether is connected to the bag body in a vertical direction at the tether connection portion, and the root portion side is connected to the length adjustment unit in a horizontal direction.

* * * * *